United States Patent [19]

Bouknecht et al.

[11] 4,038,641
[45] July 26, 1977

[54] COMMON POLLING LOGIC FOR INPUT/OUTPUT INTERRUPT OR CYCLE STEAL DATA TRANSFER REQUESTS

[75] Inventors: Max Abbott Bouknecht; Donall Garraid Bourke, both of Boca Raton; Louis Peter Vergari, Palm Springs, all of Fla.

[73] Assignee: International Business Machines Corporation, Armonk, N.Y.

[21] Appl. No.: 681,983

[22] Filed: Apr. 30, 1976

[51] Int. Cl.² .......................... G06F 3/04; G06F 13/00
[52] U.S. Cl. ....................................................... 364/900
[58] Field of Search .......................... 340/172.5; 445/1

[56] References Cited
U.S. PATENT DOCUMENTS 3,680,054  7/1972  Bunker et al. ..................... 340/172.5
3,828,325  8/1974  Stafford et al. ..................... 340/172.5

*Primary Examiner*—Melvin B. Chapnick
*Attorney, Agent, or Firm*—Robert W. Berray

[57] ABSTRACT

Common logic in a peripheral device control unit responds to a serially propagated poll signal from I/O control logic, or channel, along with a coded signal identifying either a poll for a cycle steal request or a poll for an interrupt request having one of several priorities. The poll signal received will be captured or propagated to following control units dependent upon whether the control unit has requested a cycle steal transfer, or has requested an interrupt at the priority level indicated by the coded signal accompanying the poll signal. Proper functioning of poll capture or propagation is possible even though one of the control units is physically removed from the serial chain of control units.

5 Claims, 37 Drawing Figures

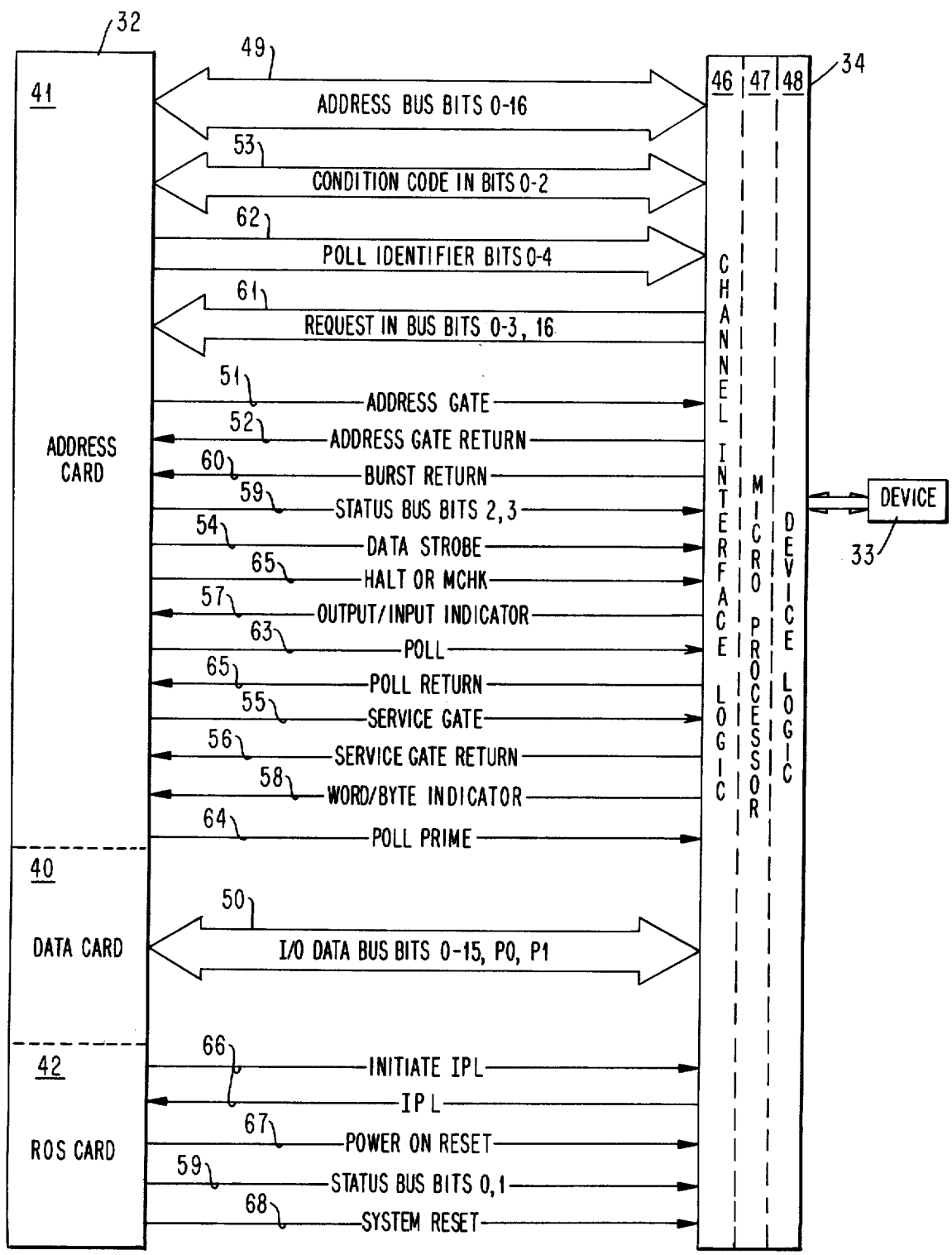

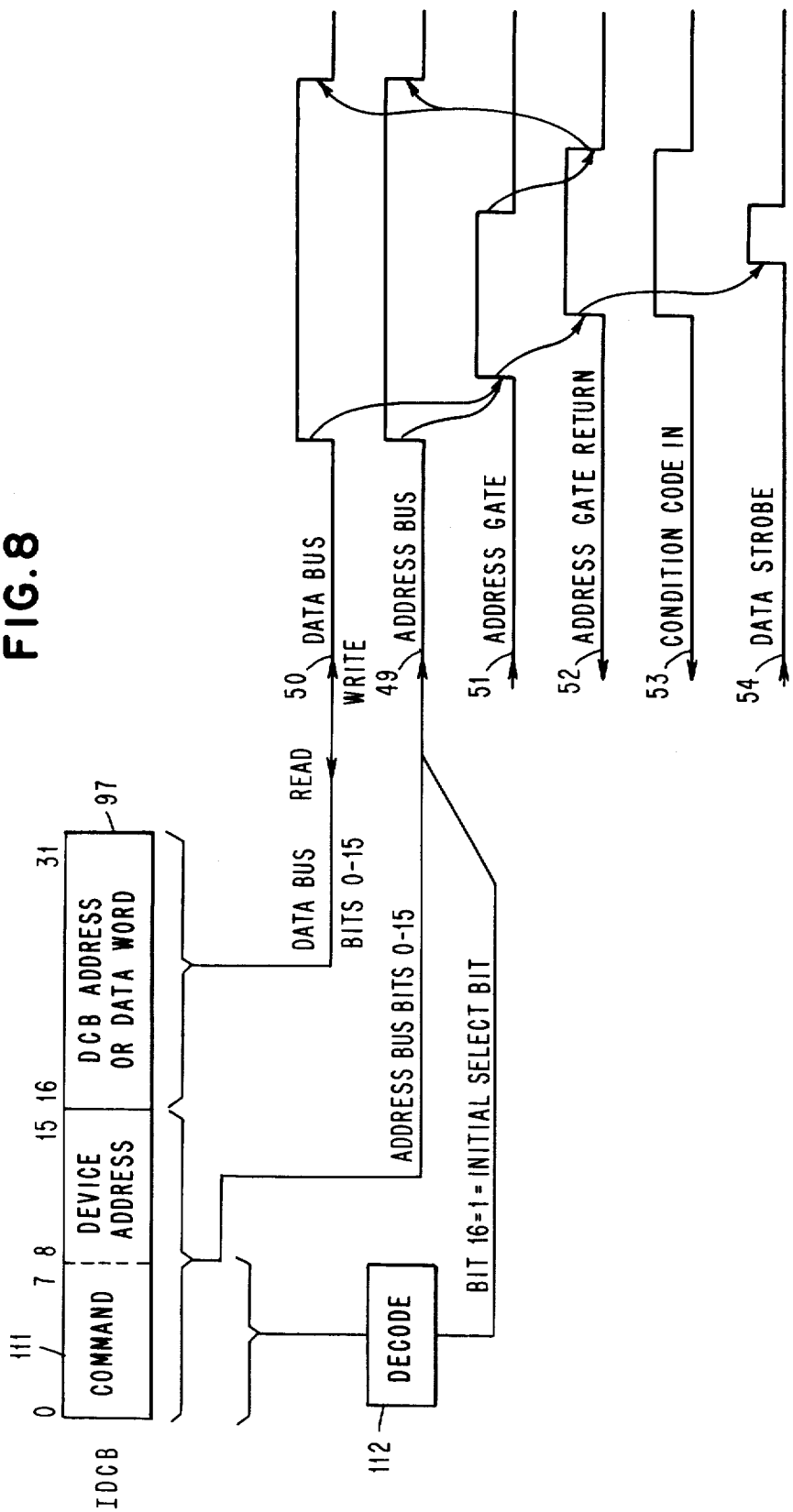

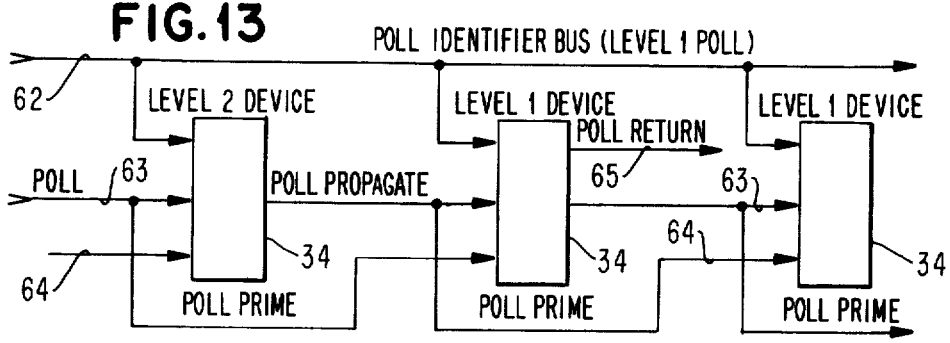
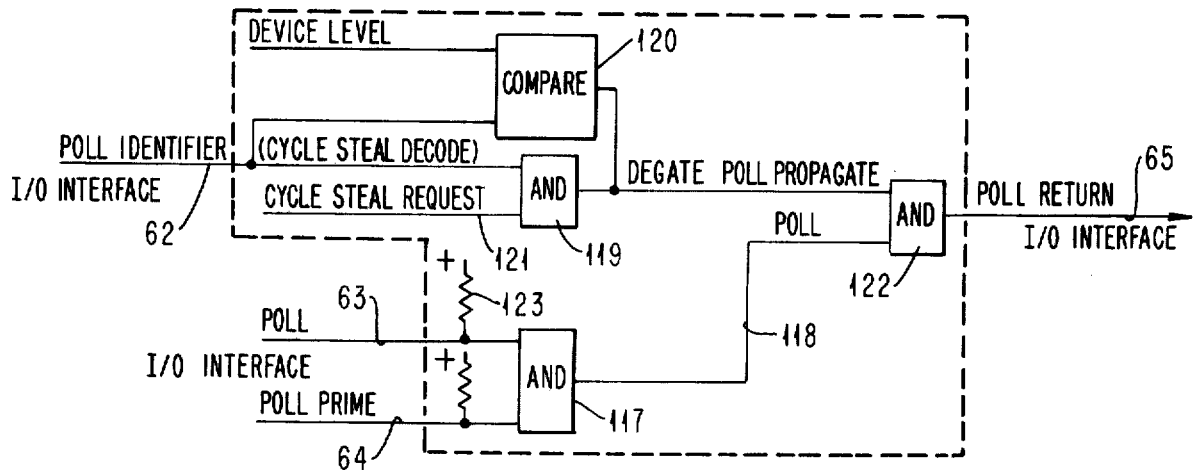
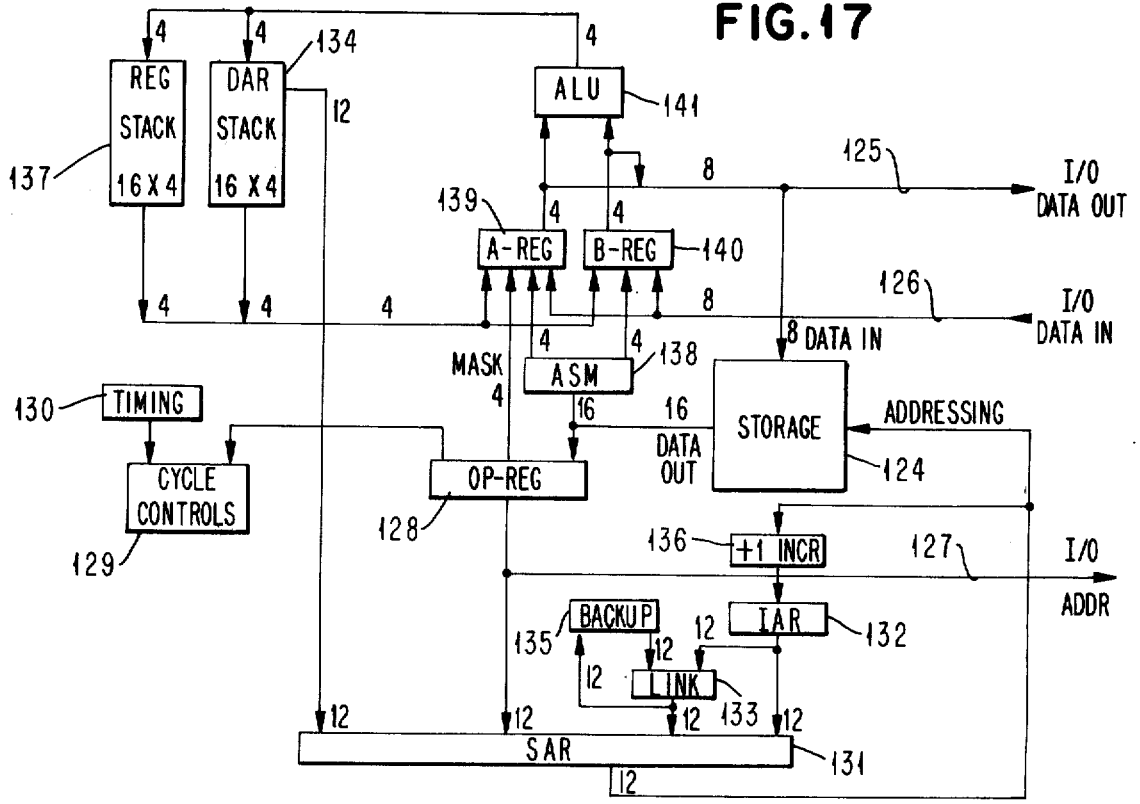

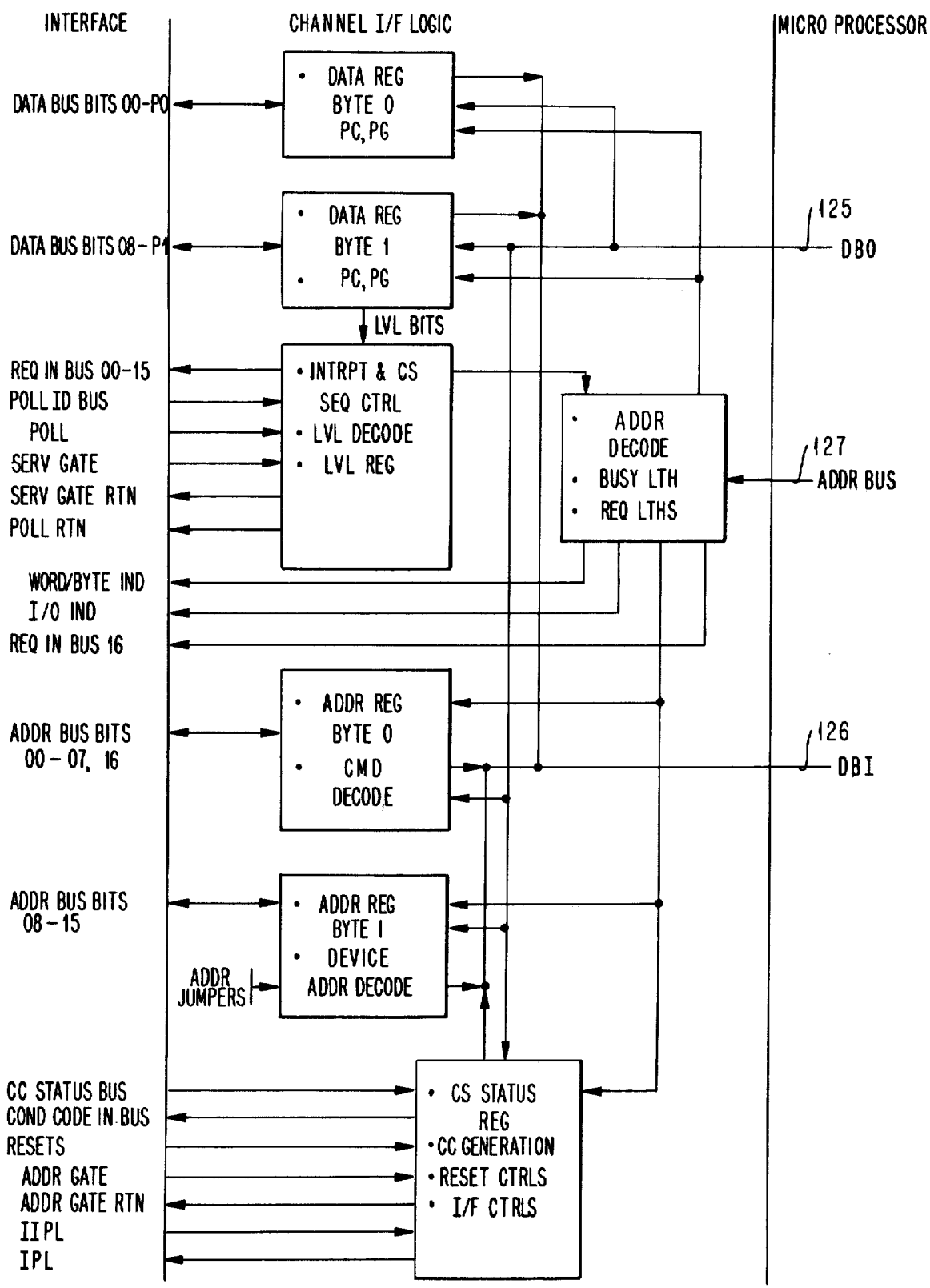

| FIG. 20A | FIG. 20B |

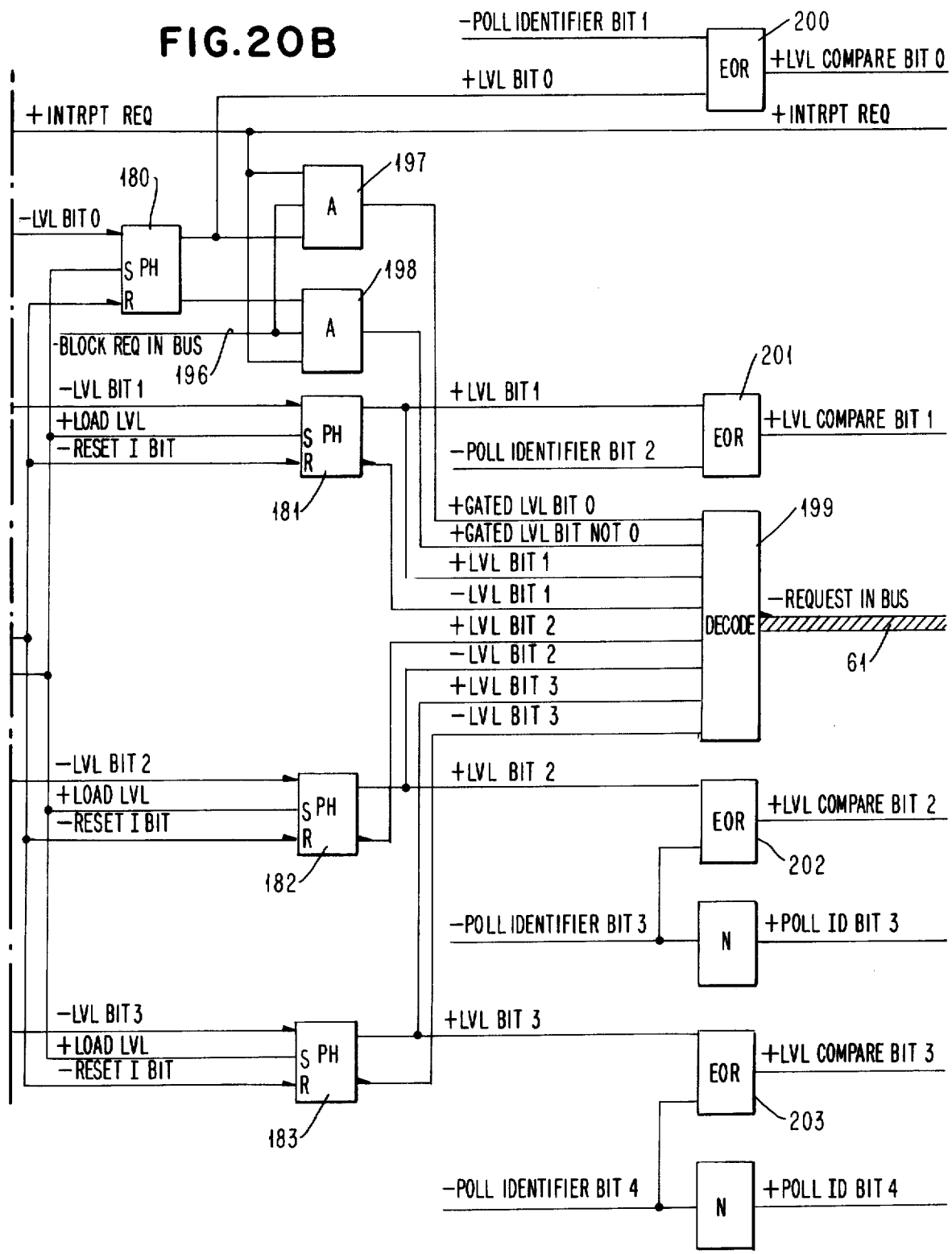

| FIG. 21A | FIG. 21B |

CURRENT LEVEL DECODER MASK & COMPARE HOLD

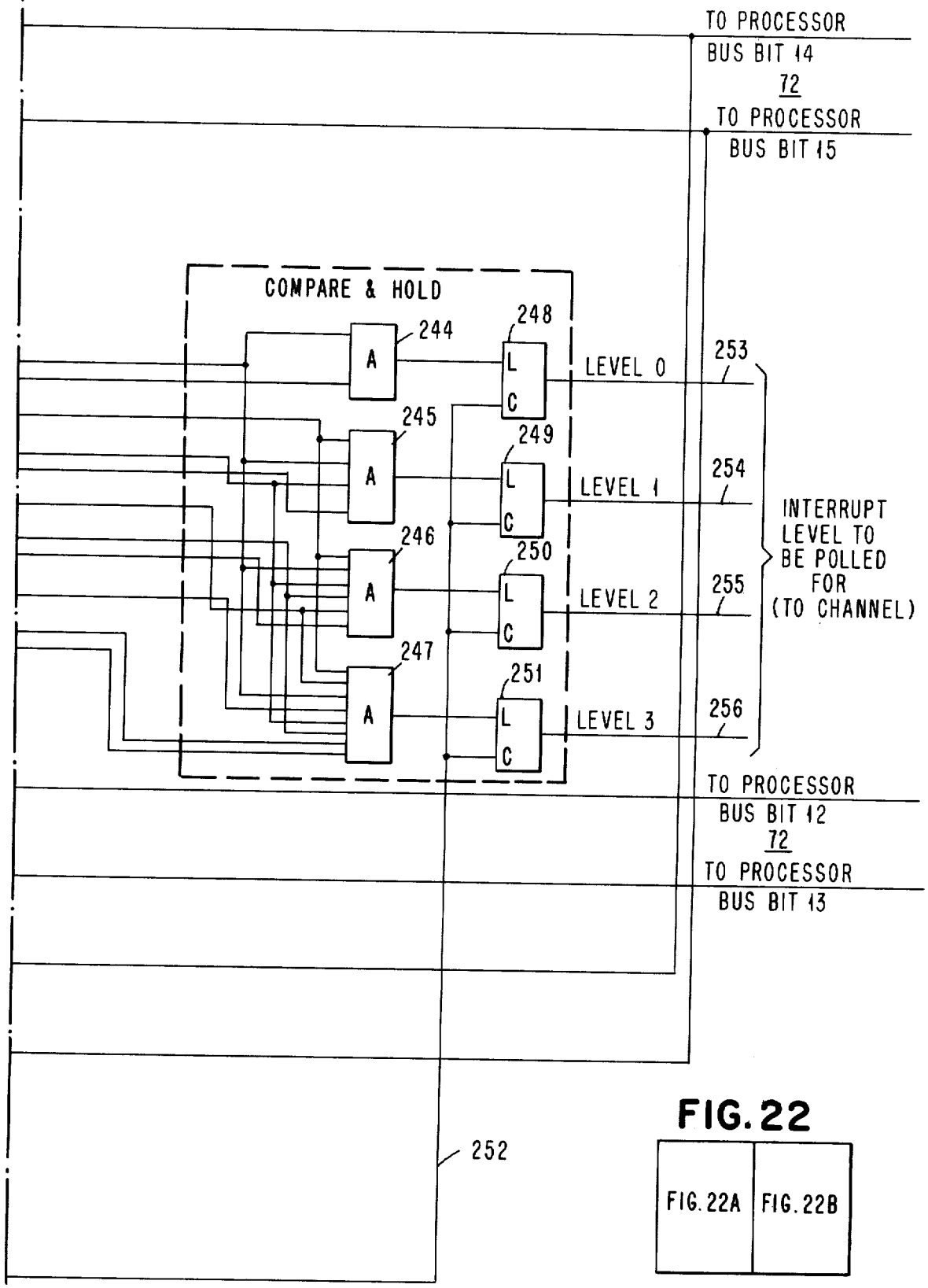

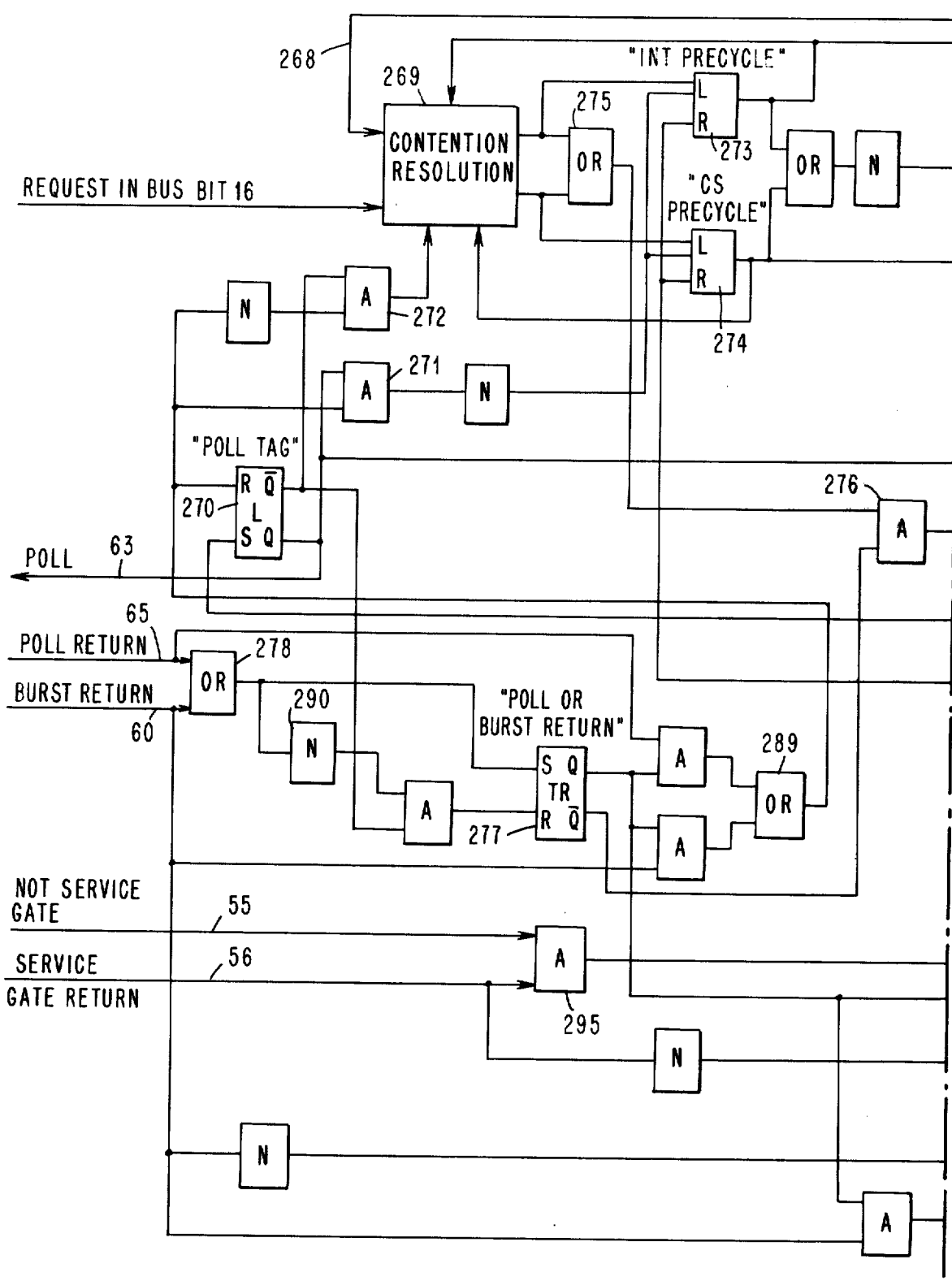
FIG. 23A  POLL SEQUENCE CONTROL

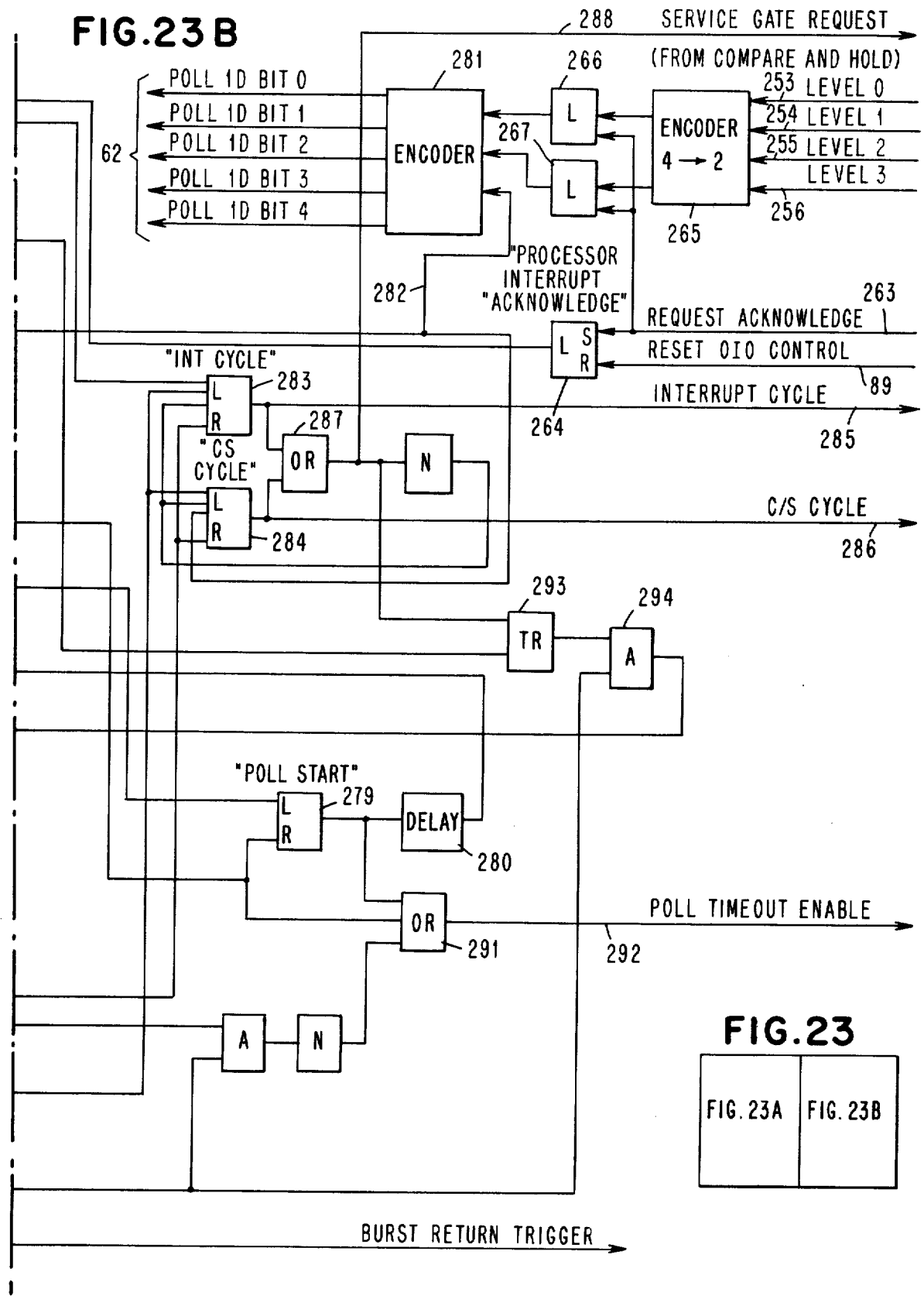

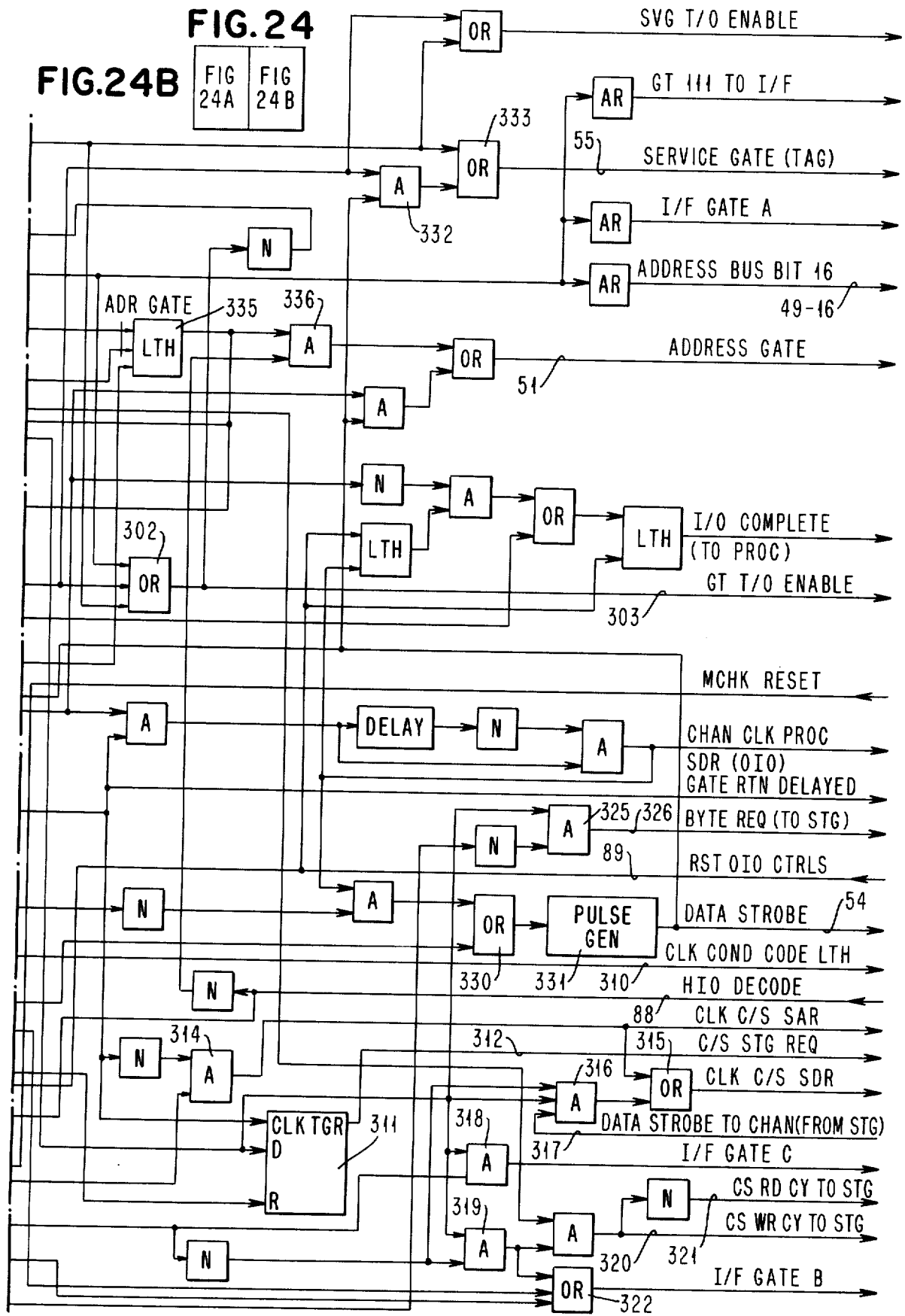

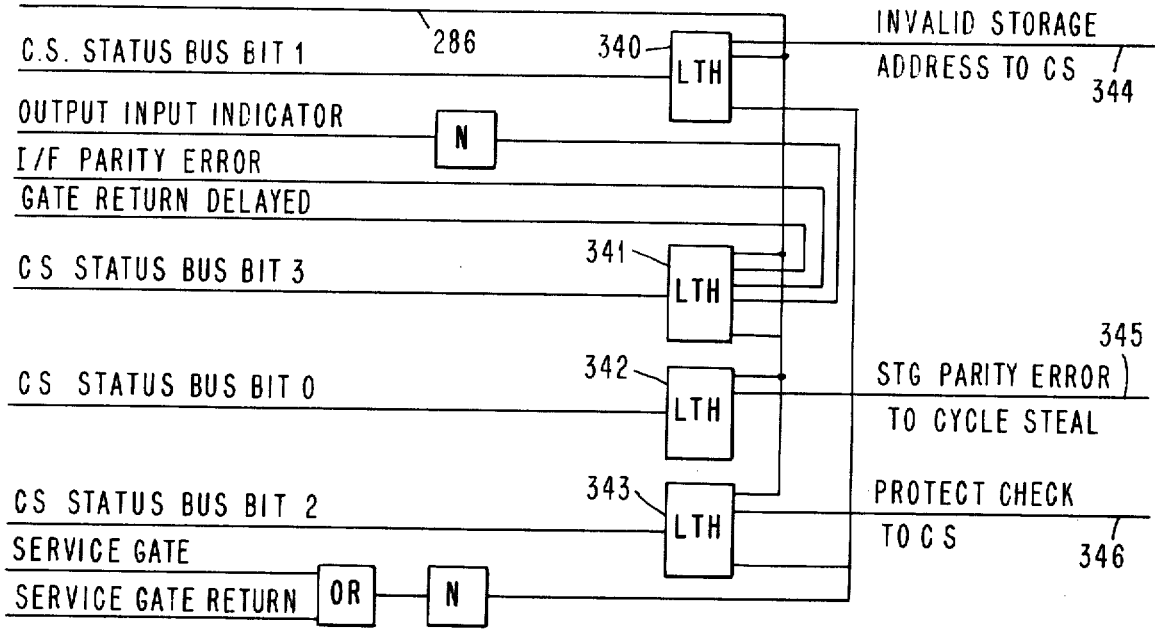
FIG.25 I/F GATE CONTROL
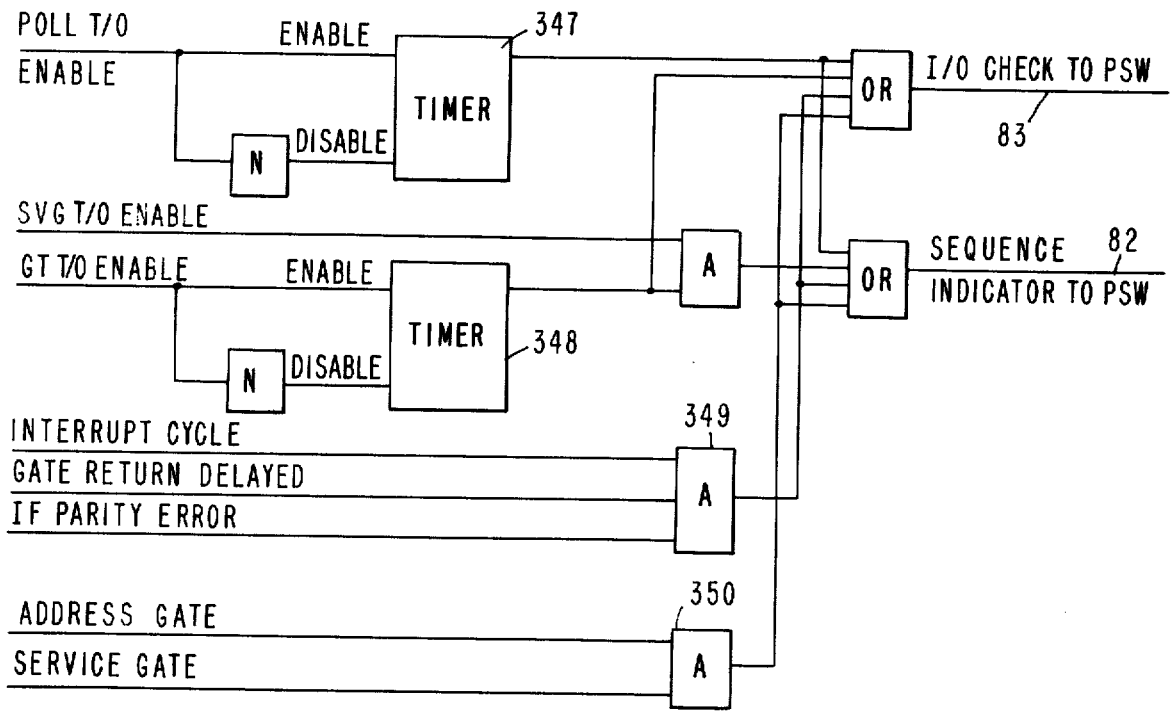
FIG.26 INTERFACE CHECK CONTROL

COMMON POLLING LOGIC FOR INPUT/OUTPUT INTERRUPT OR CYCLE STEAL DATA TRANSFER REQUESTS

RELATED U.S.A. PATENT APPLICATIONS

The subject application is related to other applications having different joint inventorships filed on the same day and owned by the same assignee. These other applications are:

| Serial No. | Title | Inventor(s) |
|---|---|---|
| 681,982 | Address Key Register Load/Store Instruction | R. E. Birney, M. I. Davis, L. A. Graybiel, R. A. Hood, S. Kahn and W. S. Osborne |
| 681,984 | Key Register Controlled Accessing System | R. E. Birney and M. I. Davis |
| 682,222 | Key Controlled Address Relocation Translation | R. E. Birney, M. I. Davis and R. A. Hood |
| 682,223 | Outer and Asynchronous Storage Extension System | D. G. Bourke and F. J. Puttlitz |
| 682,221 | Equated Operand Address Space Control System | R.E. Birney and R. A. Hood |
| 682,224 | Non-Translatable Storage Protection Control System | R. E. Birney and M. I. Davis |
| 681,985 | Supervisor Address Key Control System | R. E. Birney, M. I. Davis, R. A. Hood, T. S. McDermott and L. E. Wise |
| 682,226 | System For Controlling Address Keys Under Interrupt Conditions | R. E. Birney, W. S. Osborne and L. A. Graybiel |
| 681,953 | Task Management Apparatus | M. I. Davis |
| 682,002 | Data Processing System Featuring Subroutine Linkage Operations Using Hardware Controlled Stacks | M. I. Davis, T. S. McDermott, G. W. Mayes and L. E. Wise |
| 682,229 | Input/Output Interface Logic For Concurrent Operations | M. A. Bouknecht, M. I. Davis and L. P. Vergari |
| 682,228 | Residual Status Reporting During Chained Cycle Steal Input/Output Operations | D. G. Bourke and L. P. Vergari |
| 682,227 | Translator Lookahead Controls | D. G. Bourke |

BACKGROUND OF THE INVENTION

This invention is directed to digital computer systems, and more specifically to the interaction between peripheral I/O units and a central processor in the computer system.

The control of transfer of data between the storage of the central processing unit and peripheral I/O devices over an input/output bus, or interface, can take many forms. Among the forms of input/output control for the purpose of data transfer are, direct program instruction control for each transfer of data, the initiation of data transfers by a central processor after which subsequent data transfer is accomplished under control of the peripheral device without use of the central processor, and logic for handling interrupt requests from peripheral devices to inform the central processor of peripheral device status. Included in various of these concepts are control mechanisms for permitting peripheral devices to initiate interrupt handling in the central processor by directly informing the processor of the device and status requiring handling, or the interrupt request may require the central processor to initiate a polling signal to all attached devices, in series, to subsequently permit information to be transferred to the central processor identifying the device and status causing the interrupt.

In systems utilizing direct program control for each data transfer between a peripheral device and main storage, interfaces are usually provided which require, in response to the program instruction, the sequential transfer of device addresses commands, and/or data to the peripheral device.

In data processing systems which not only provide for direct program control data transfers, but also cycle steal data transfers, different forms of program instructions are normally required. Even if different forms of initiating instructions are not required, different forms of peripheral device control information are required, which must be recognized by the peripheral device control unit and handled differently. Therefore, each peripheral device control unit must have specialized logic. Further, if the input/output control system is also required to handle asynchronous requests for interrupt servicing by the processor, additional circuitry in the peripheral device control unit must be provided.

During cycle steal data transfer operations when a peripheral device control unit has been provided with sufficient information to initiate and control further use of the interface bus for controlling the storage unit independent of the processor, certain exceptional conditions may occur prior to completion of the data transfer requiring special handling by the central processor before re-initiating the data transfer.

Normally, input/output control systems which are adapted to handle direct program control, cycle steal, or interrupt request transfers on a common interface, must handle each of these situations exclusively on the interface bus, preventing any other form of request from being processed.

In prior systems, polling logic has been provided for responding to an unknown interrupt request which signals the priority of the interrupt request. I/O control logic responds with a serial poll signal combined with identification from the central processor of the priority of the interrupt request being polled, to cause selection by a proper peripheral device control unit for subsequent use of the interface bus. The priority interrupt request made by a peripheral device control unit can be modified by a central processor. However, in these prior systems, the modification of the priority level of a peripheral device control unit could only be accomplished when the device associated with the peripheral device control unit is not busy with some previous command. Further, prior art systems which combine cycle steal data transfers with interrupt request handling have been required to provide separate logic within a peripheral device control unit and input/output control logic of the central processor to poll for the two forms of communication required.

Prior systems which incorporate a serial poll signal for the purpose of selecting one of a plurality of peripheral device control units, all of which are requesting service, require use of logic within each peripheral device control unit to propagate the serial poll signal to succeeding devices. In these prior systems it is readily evident that if a particular peripheral device control unit, or device, were physically removed from the input/output bus, proper functioning of the poll propagation would not be possible.

SUMMARY OF THE INVENTION

In view of the above mentioned inflexibility and expense of providing separate circuitry, it is a primary object of the present invention to provide a serial polling mechanism for an otherwise parallel input/output bus, in which the logic of the peripheral device control unit and input/output control logic of the central processor is common for the purpose of polling plural devices for either interrupt requests or cycle steal data transfer requests.

It is another object of the this invention to provide a serial polling mechanism in which proper propagation of poll signals to all peripheral device control units can function with physical removal of alternate peripheral device control units on the interface bus.

These and other objects are achieved by providing common circuitry in the input/output control logic of the central processor, and peripheral device control units. Logic in the input/output control logic receives interrupt requests at different priority levels and cycle steal transfer requests and selects to poll for either a cycle steal transfer request, signalled on a particular request in line from peripheral device control units, or to poll for an interrupt request at some particular interrupt level. If the I/O control logic has determined that the poll signal to be propagated should be for an interrupt request, the poll identification bus is provided with coded information identifying the interrupt level being polled for. If however, the I/O control logic determines that a cycle steal transfer request should be polled for, the poll identification signal lines are provided with a predetermined code which identifies a poll for cycle steal transfers.

Receipt of the poll signal, and recognition of a cycle steal poll identification, along with a cycle steal transfer request in the peripheral device control unit, causes the first peripheral device control unit receiving the poll signal to capture the poll, prevent further propagation of the poll, and generate a poll return signal to the I/O control logic indicating capture of the poll. Preventing further poll propagation and generation of the poll return signal can also take place when the poll identification for an interrupt request matches the present interrupt level of a peripheral device control unit, which had previously generated an interrupt request to the I/O control logic.

Physical removal of alternate peripheral device control units can be accomplished by causing each peripheral device control unit to generate a poll propagate signal to succeeding peripheral device control units, which propagated poll signal is in fact two separate poll signals. A first of the propagated poll signals will be presented to the next physically adjacent and succeeding peripheral device control unit. The other of the propagated poll signals will be transferred to the second succeeding physical peripheral device control units. Each peripheral device control unit generates an internal poll signal when it receives both of the generated poll signals from a first, next preceding peripheral device control unit, and a poll propagated signal from the peripheral device control unit next preceding the first peripheral device control unit. If a peripheral device control unit is physically removed from the interface bus, the poll propagate signal line which has been eliminated causes the poll receiving mechanism of a succeeding peripheral device control unit to be clamped at a level which represents the normal receipt of a propagated poll signal.

DESCRIPTION OF THE DRAWINGS

FIG. 3 identifies the lines of an input/output (I/O) interface (I/F) bus interconnecting I/O control (Channel) logic in a central processing unit (CPU) and a peripheral device control unit in accordance with the present invention.

FIG. 8 is a representation of information in an immediate device control block transferred to a peripheral device control unit, and the timing involved.

FIG. 13 is a general representation of the concept of a serial poll signal being propagated serially from peripheral device control unit to peripheral device control unit selecting a device to use the interface bus.

FIG. 14 shows major components of the present invention for receiving poll signals from a preceding peripheral device control unit, capture of the interface, and signalling thereof back to the I/O control logic of a data processing system.

FIG. 16 is a block diagram of the major components of channel interface logic connecting the interface bus to the peripheral device control unit.

FIG. 17 shows the major components of a micro processor utilized in a preferred embodiment of the present invention as part of a peripheral device control unit.

FIGS. 20A and 20B are to be arranged to show a detailed logic diagram of the manner in which a peripheral device control unit energizes one of a plurality of interrupt request in lines of an I/O bus in accordance with a priority level, and compares the present priority level of a device with poll identification signals received on the I/O bus from a central processing unit I/O control logic.

FIG. 22 shows hows FIGS. 22A and 22B are to be arranged to show a detailed logic diagram of the priority interrupt determination logic of I/O control logic in accordance with the present invention.

FIG. 23 shows how FIGS. 23A and 23B are to be arranged to show a detailed logic diagram of the poll sequence control of I/O control logic in accordance with the present invention.

FIG. 24 shows how FIGS. 24A and 24B are to be arranged to show a detailed logic diagram of the interface gate control of the I/O control logic of the present invention.

FIG. 25 is a detailed logic diagram of controls generated by error conditions in the interface gate control of the I/O control logic of the present invention.

FIG. 26 is a detailed logic diagram of the interface check control of the I/O control logic of the present invention.

DETAILED DESCRIPTION

Data Processing System

Figure 1:
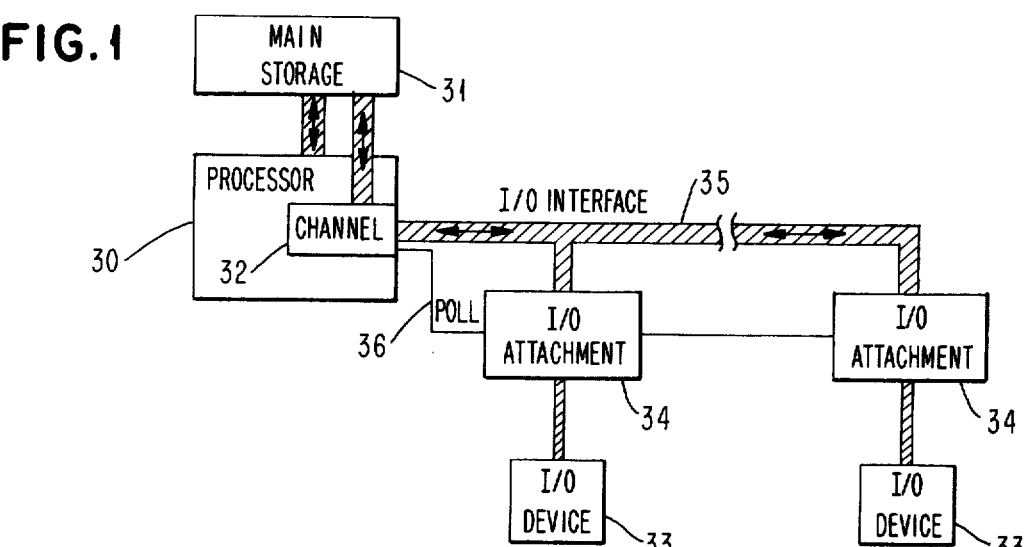
FIG. 1 is a block diagram showing the major components of a data processing system utilizing the present invention.

The total environment of the invention is depicted in FIG. 1. The present invention is utilized in a data processing system that includes a central processing unit (CPU) 30, a main storage unit 31 for storage of data, machine instructions, and input/output (I/O) control information, and I/O control logic (Channel) (32). The invention deals with the control of the transfer of data and control information to I/O devices 33 through peripheral device control units or I/O attachments 34 utilizing an I/O interface (I/F) bus 35 which connects the various units in parallel for the transfer of data, address information and control information. Also shown is a poll signal on a line 36 which interconnects the peripheral device control units 34 in series for the purpose of selecting a particular I/O device 33 for attachment to the I/O interface 35 during a particular transfer cycle.

Figure 2:
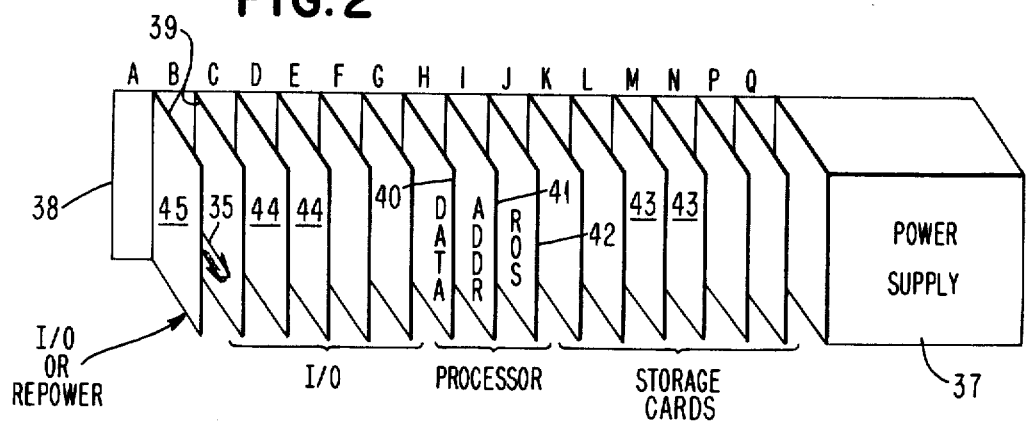
FIG. 2 is a representation of the physical configuration of a data processing system utilizing the present invention.

A physical representation of the data processing system utilizing the present invention is shown in FIG. 2. The physical arrangement includes a power supply 37, a rack, or card file 38, and a plurality of pluggable cards 39 containing the circuits making up the various units of the data processing system.

Three cards 40, 41 and 42 include circuits which comprise the processor 30. Various parts of the I/O control logic 32 are distributed on the processor cards. A number of storage cards 43, depending on the amount of storage desired, are plugged into the card file 38.

The I/O attachment 34 as shown in FIG. 1 is represented by each of a selected plurality of cards 44. If it is desired to attach additional I/O devices to the system, a repower and isolation card 45 may be included. The power card 45 has the function of repowering the I/O interface lines 35 to an additional rack and isolating the components shown in FIG. 2 if any additional racks should lose power and thereby normally render the I/O interface 35 ineffective.

Card 42 is a read only store (ROS) card containing a microprogram control mechanism for the data processing system. The address (ADDR) card 41 contains all the program accessible hardware such as data and status registers, and forms addresses used to access the storage unit 31 and I/O devices 33. The DATA card 40 performs all arithmetic and logical operations and provides the gating for data to and from the I/O interface 35 and the storage unit 31.

INTERFACE LINES

In FIG. 3, there is depicted the I/O control logic for channel 32 distributed between the address card 41, data card 40, and read only store card 42. Also depicted is an I/O attachment card 44 of FIG. 2 for a peripheral device 33. The interface bus 35 in accordance with the present invention may accommodate any number of different devices 33. However, in accordance with a preferred embodiment of the present invention, each I/O attachment card 44, which represents a peripheral device control unit, will have common circuitry divided between channel logic 46 and a microprocessor 47. Added to the common circuitry is device logic 48, which is dependent upon the particular device 33 to be controlled.

Subsequent discussion of the operation of a peripheral device control unit 34, in accordance with a preferred embodiment of the present invention, will discuss operation of a micro processor 47. However, the common circuitry 46 and 47 could be comprised of only combinatorial and sequential logic.

There are three basic forms of communication between an I/O device 33 and the I/O control logic 32 which, depending on the type of device 33 may require use of up to 81 lines on the I/O interface 35. Two forms of communication are initiated by a program instruction identified as Operate I/O (OIO). These two forms of communication are primarily for exchange of data, and are identified as a direct program control (DCP) transfer or cycle steal (CS) transfer. In the DPC form of transfer, each OIO instruction effects the transfer of one item of information between the storage unit 31 and I/O device 33 in either direction. The cycle steal form of transfer is initiated by the processor 30, and involves the transfer of I/O command information to the peripheral device control unit 34 for subsequent use by the peripheral device control unit 34 to control the transfer of a plurality of items of data between the storage unit 31 and peripheral device 33. This transfer is independent of, and concurrent with, other processor 30 operations. The third form of communication required between the processor 30 and device 33, is the initiation of program interrupt sequences in the processor 30 in response to requests for processor service by a peripheral device 33.

The interaction of the I/O control logic 32, interface bus 35, and peripheral device control unit 34 to accomplish these forms of communication will now be discussed in detail.

Each of the 81 lines of the I/O interface 35 will now be briefly defined utilizing the representation in FIG. 3. There are two bidirectional busses essential to the operation, and these include a 17-bit, bidirectional, address bus 49, and a 16-bit plus two parity bit I/O data bus 50.

To control communication on the I/O bus 35 in response to the decode of an OIO instruction, for the purpose of transferring data or I/O control information on the data bus 50, requires use of the address bus 49. Other interface lines required to control the transfer are address gate 51, address gate return 52, condition code in bus 53, and data strobe line 54, which will be energized in proper sequence to control the communication.

During cycle steal (CS) communications, transfer of data on the data bus 50 and storage unit 31 address information on the address bus 49 is effected from the device control unit 34. Additional lines on the interface bus 35 required for this type of transfer include a service gate signal 55, service gate return 56, input/output indicator 57, word/byte indicator 58, and a four-bit status bus 59 distributed between the read only store card 42 and address card 41. If the central processor 30 and storage unit 31 have a storage protect mechanism installed, the condition code bus 53 is utilized during CS operations to transfer a storage protect key from the device control unit 34 to the storage protect mechanism.

Normally, transfer of cycle steal information between the I/O control logic 32 and device control unit 34 involves a single transfer followed by selection of another device for further operations. An additional type of transfer may be implemented, and would be identified by a signal on a line labeled burst return 60. The burst return signal 60 energizes controls in both the device control unit 34 and I/O control logic 32 to permit, in response to one selection of the device 33, a plurality of transfers of cycle steal information on the I/O bus 35 before selecting another device.

A third basic form of communication involves the requirement to signal the I/O control logic 32 that a particular device 33 desires to interrupt the central processor 30. The interface 35 lines primarily involved are a request in bus 61 and a poll identifier bus 62. To explain more fully, a device control unit 34 will have been assigned a particular priority interrupt level by means of a prepare command. The interrupt level assigned may be one of four different levels, although the concept of the invention in this regard can accommodate up to 16 different levels. When a device 33 requires interrupt service, a portion of the channel interface logic 46 of the peripheral device control unit 34 will energize a particular one of the four lines on bus 61 indicating an interrupt request. The particular one of the lines on bus 61 energized is associated with the priority interrupt level assigned. One additional line in the bus 61 is identified as bit 16, and is energized to inform the I/O control logic 32 of a need for transfer by a device 33 utilizing the cycle steal form of transfer.

When a particular device 33 has signalled either a priority interrupt request, or cycle steal request, on bus 61, interrupt control logic in the I/O control logic 32 and processor 30 determines which one of a plurality of priority levels or cycle steal requests can be acknowledged to establish connection between the I/O control logic 32 and device 33. The poll identifier bus 62 is coded with binary information to indicate which interrupt priority level is being acknowledged, or will signal a particular binary code on the poll identifier bus 62 indicating that any cycle steal request is being acknowledged.

As part of the selection of a device 33 to be permitted connection to the I/O bus 35 in response to an interrupt request or cycle steal request, the I/O control logic 32 generates a poll signal 63 and a poll prime signal 64. The poll signals 63 and 64 are propagated serially through all device control units 34 attached to the interface bus 35. As part of the device selection for use of the bus 35, the poll and poll prime signals 63 and 64 interact with the coded information on the poll identifier bus 62 to cause a particular device control unit 34 to be selected. When a peripheral device control unit 34 recognizes a poll identification on bus 62 corresponding to its present priority interrupt level, or that it requires cycle steal transfer and recognizes the particular identification code, and also receives the poll and poll prime signals 63 and 64, the selection is made, and this fact is returned to the I/O control logic 32 on a signal line poll return 65. Receipt by a device control unit 34 of the poll and poll prime signals 63 and 64, and in the absence of recognizing a proper code on the poll identification bus 62, will cause the device control unit 34 to propagate the poll and poll prime signals 63 and 64 to succeeding peripheral device control units 34.

Additional signal lines on the interface bus 35, not previously discussed and which do not form part of the present invention, are included in the preferred embodiment of the I/O bus 35. These lines include a halt or machine check signal line 65 for halting a device previously started, two lines 66 utilized for control and transfer during an initial program load from a device 33 to storage unit 31, power on reset line 67 to cause all logic in the device control units 34 to be reset to a known state, and system reset line 68 for establishing known conditions in response to processor controls.

Throughout the remainder of the description and on the remaining drawings, signal lines and busses will be identified as shown in FIG. 3. Any reference to a particular binary bit on a larger bus will be identified by the bus number, hyphen, and bit number. For example, the line labeled 16 on bus 61 will be identified as 61-16.

CPU - I/O Control Logic General Description

Figure 4:
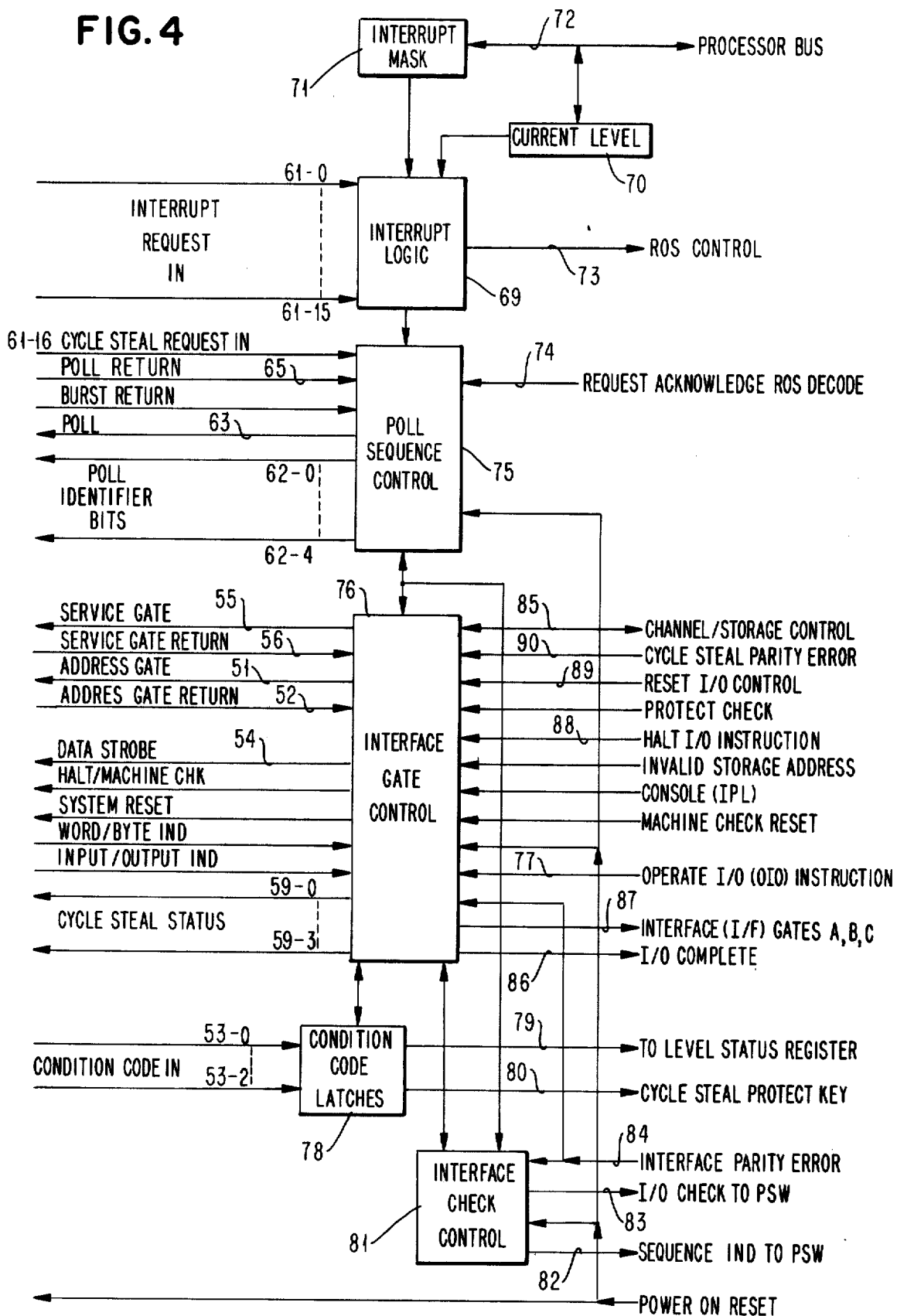
FIG. 4 is a block diagram showing the major components of the I/O control logic of a data processing system.

Major functional components of the I/O control logic 32 shown in FIG. 1 are shown in FIG. 4. A preferred embodiment of the present invention may be used with a central processor 30 which has a logical mechanism for indicating the level of importance of a particular program being executed in the processor 30. Any requests for execution of a program of more or less importance than the current level will determine the response of the processor 30 to such request. As part of the I/O control logic 32, there is interrupt logic 69 for comparing the importance of an interrupt request from I/O devices as signalled on bus 61 with the level of importance of the present processor 30 program indicated in a current level register 70. As in many other data processing systems, the ability of any particular interrupt to be effective can be modified by the use of an interrupt mask contained in a register 71. The contents of the current level register 70 and interrupt mask 71 can be modified by data on the processor data bus 72 in accordance with programmed instructions. In accordance with the settings of the current level register 70, mask 71, and level of the interrupt request in on bus 61, the read only store control of the processor 30 can be notified on a line 73 of the requirement to control the processor 30 to discontinue operation at the current level and initiate an interrupt.

After necessary housekeeping functions in the processor 30, the read only store control mechanism will return a signal on line 74 indicating that an interrupt request or cycle steal request indicated on bus 61-16 can be acknowledged.

At this point in time, the processor 30 and therefore programs stored in the storage unit 31 do not know the identity of the particular device that made the request that is being acknowledged. Therefore, the I/O control logic 32 further includes a poll sequence control mechanism 75 which initiates a poll signal on line 63 along with coded information on the poll identifier bus 62 indicating whether a cycle steal request is being honored, or identifies a particular priority interrupt level being acknowledged. In response to a signal on poll return 65 indicating that a device 33 has captured the poll signal 63, the poll sequence control 75 initiates the necessary exchange of signals between the I/O control logic 32 and peripheral device control unit 34.

The control of the transfer of signals, and response thereto, in the I/O control logic 32 is accomplished in logic called interface gate control 76. If, as previously discussed, a poll sequence was initiated for interrupt or cycle steal reasons, the primary signal lines energized and responded to in the interface gate control 76 are the service gate 55, service gate return 56, and data strobe 54. If the selection has been made for cycle steal transfers, various cycle steal status information on bus 59 is transferred to the peripheral device control unit 34 indicating various conditions of the cycle steal operation.

If the interface gate control 76 is to initiate and control information transfer a signal on line 77 will be received from the instruction register of the processor 30 indicating the decode of an Operate I/O instruction. Response to the signal on line 77 requires energization of and response to the signal lines address gate 51, address gate return 52, and data strobe 54. Further, response to each OIO instruction by the addressed peripheral device control unit 34 is signalled by information on the condition code in bus 53 which is entered into latches 78 for presentation to level status registers in the processor 30 on the three lines 79. If cycle steal transfers are taking place, the storage protect key will be sent to the storage protect mechanism on lines 80.

Interface check control logic 81 responds to and generates various signals indicating the correctness of the operation of the I/O control logic sequence on a line 82, other I/O and device related errors on I/O check line 83, and responds to a signal on a line 84 indicating that a parity error was detected during a cycle steal data transfer. The designation PSW refers to the processor status word in the processor 30. The PSW can be sensed by program control to monitor and indicate various errors and exceptions within the data processing system.

Control of the timing between the I/O control logic 32 and storage unit 31 is accomplished generally on lines 85. Completion of an I/O sequence is signalled to the processor 30 on a line 86 and control of gates within the processor labeled A, B, and C, required to accomplish data transfer is signalled on three lines 87. The decode of a halt I/O instruction by the processor 30 is signalled to the interface gate control 76 on a line 88 and any requirement to reset the I/O control mechanism is signalled on a line 89 from the processor 30. During cycle steal operations, any parity error detected on the interface in the transfer of data into storage unit 31 is signalled on a line 90. Various other lines to and from the processor 30 have been named in FIG. 4 and are essentially self explanatory and not required for an understanding of the operation of the present invention.

Figure 5:
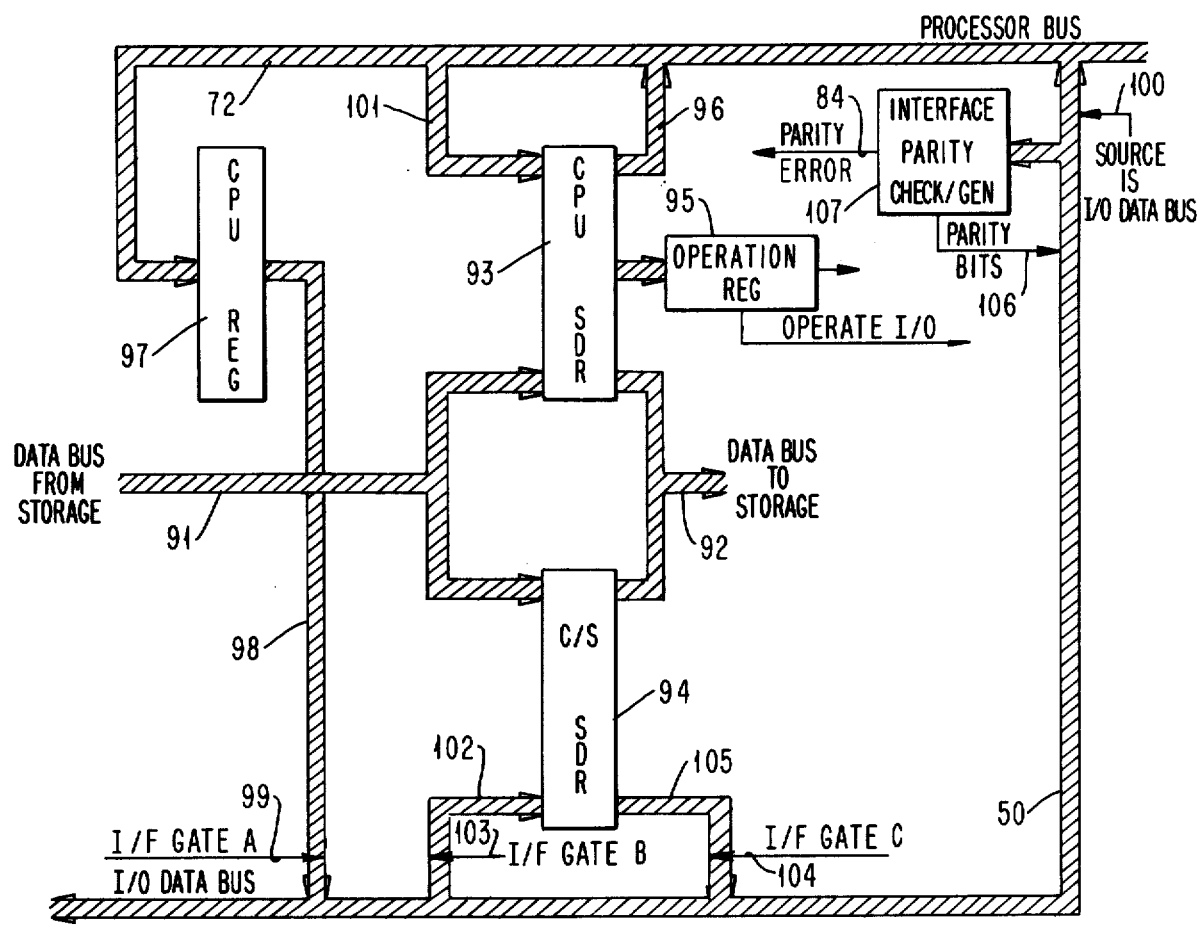
FIG. 5 shows certain registers and data busses of a central processing unit required for interaction with, and an understanding of, the present invention.
Figure 6:
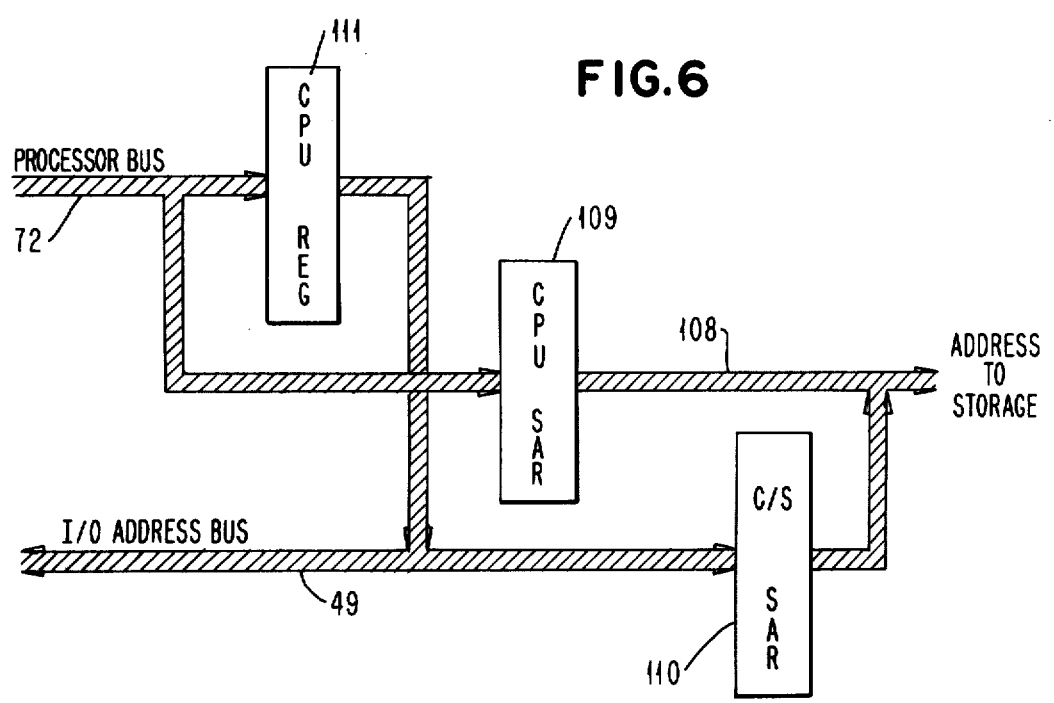
FIG. 6 shows certain registers and busses of a central processing unit utilized with the present invention for handling address information.

In FIGS. 5 and 6 various registers and busses contained in a processor 30 for accomplishing I/O operations are shown. All the busses and registers shown are comprised of 16 binary bits. The processor bus 72 has a number of other units attached such as the arithmetic and logic unit, local storage, and additional registers primarily concerned with data processing functions.

Data from storage unit 31 is received on a bus 91, and entered into storage unit 31 on a bus 92. Data received from the storage unit 31, when to be used primarily within the processor 30 is received in a CPU storage data register (CPU SDR) 93, and when data is being transferred between peripheral devices 33 and the storage unit 31 during cycle steal operations, data will be entered into a cycle steal storage data register (CS SDR) 94.

Also shown in FIG. 5, is an operation register 95 which receives program instructions from storage unit 31 on bus 91 and CPU SDR 93 to be decoded for control of operations of the system. Of particular concern to the present invention is the decoding of an instruction called Operate I/O (OIO).

When the OIO instruction is to effect a direct program control transfer of data from the storage unit 31 to a peripheral device 33, the data will be received from the storage unit 31 on bus 91, entered into the CPU SDR 93, transferred to the processor bus 72 on a further bus 96, entered into one of the CPU registers 97, and presented to the I/O data bus 50 on a bus 98 in response to energization of IF gate A 99 in response to controls from the I/O control logic 32. Direct program control of data transfer from an I/O device 33 to the storage unit 31 would be accomplished by presenting data on the I/O data bus 50 to the processor bus 72 by energization of gates represented at 100, entering the data into the CPU SDR 93 from a bus 101, and transferring the data to the storage unit 31 on bus 92.

Transfer of data during cycle steal operations from the I/O device 33 to the storage unit 31 will involve transfer of data from the I/O data bus 50 into the CS SDR 94 on a bus 102, by energization of IF gate B 103, followed by transfer of the data from the CS SDR 94 to the storage unit 31 on bus 92.

Cycle steal output transfers would involve the transfer of data from the storage unit 31 on the bus 91 into the CS SDR 94, followed by energization of IF gate C 104 to present the data on a bus 105 to the I/O data bus 50.

The generation of parity bits 106 to be included with data from the I/O data bus 50, or the signalling of parity errors on line 84, is accomplished in the interface parity check/generator 107 during I/O operations.

FIG. 6 shows the busses and processor 30 registers required for the transfer of address information between I/O devices 33 and the storage unit 31. Addresses are presented to the storage unit 31 on a bus 108 from either a CPU storage address register (CPU SAR) 109 or, during cycle steal transfers from a cycle steal storage address register (CSSAR) 110. As part of the present invention, selection of a particular I/O device 33, and transmission of commands to the device 33, is accomplished utilizing the I/O address bus 49. This information is presented to the I/O address bus 49 from a further CPU register 111 which receives the information from the processor bus 72.

OIO-IDCB-DCB FORMATS AND TIMING

Figure 7:
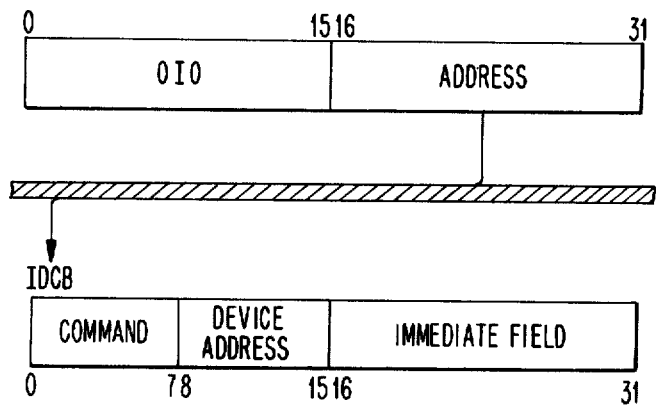
FIG. 7 is a representation of a data processing system program instruction and immediate device control block (IDCB) for initiating I/O operations in accordance with the present invention.

FIG. 7 shows the two word (32-bit) Operate I/O (OIO) instruction decoded in the operation register 95 of FIG. 5 which initiates all I/O operations from the processor 30. It is a privileged instruction and may only be fetched in supervisor state. If this instruction is fetched in problem state, a privilege violate program check is set, and a class interrupt is taken.

The effective address, generated by this instruction, points to, and addresses, an Immediate Device Control Block (IDCB) in storage unit 31. The IDCB contains a command field (bits 0–7), device address field (bits 8–15), and the immediate data field (bits 16–31).

In the command field, the first hex digit (bits 0–3) identifies the type of command, and the second hex digit (bits 4–7) is a modifier. The types of command are Read, Read ID, Read Status, Write, Prepare, Control, Device Reset, Start, Start Cycle Steal Status, and Halt I/O.

The device address field contains the device 33 address. Device 33 addresses are selectable by switches or jumpers on each I/O attachment card 34.

For direct program control (DPC) operations, the immediate field of the IDCB in storage unit 31 contains the word to be transferred from the storage unit 31 to the I/O device 33, or the word from the device 33 to be stored in storage unit 31. For cycle steal operations, the immediate field contains the address in storage unit 31 of a device control block (DCB).

The Read command transfers a word or byte from the addressed device 33 to immediate field word of the IDCB. If a single byte is transferred, it is placed in bits 24–31 of the data word.

The Read ID command transfers an identification word from the device 33 to the immediate field of the IDCB. The device identification word contains physical information about the device and is used by diagnostic programming to tabulate a system configuration. This word is not related to the interrupt ID word associated with interruption processing.

The Read Status command transfers a device status word from the device 33 to the immediate field of the IDCB. Contents of the status word are device dependent.

The Write command transfers a word or byte of data to the addressed device 33 from the immediate field of the IDCB. If a single byte is to be transferred, it is placed in bits 24–31 of the data word and bits 16–23 are ignored.

The Prepare command transfers a word to the addressed device 33 that controls its interruption level. The word is transferred from the second word of the IDCB in which bits 16–26 are zeros, bits 27–30 are a level field, and bit 31 is an I-bit. A priority interruption level is assigned to the device 33 by the level field. The I-bit (device mask) controls the device interruption capability. If the I-bit equals 1, the device is allowed to interrupt.

The Control command initiates a control action in the addressed device 33. A word, or byte, transfer from the immediate field of the IDCB to the addressed device may or may not occur, depending on device requirements.

The Device Reset command resets the addressed device 33. A pending interruption from this device is cleared. The device mask (I-bit) is not changed.

The Start command initiates a cycle steal operation for the addressed device 33. The second word, or immediate field, of the IDCB is transferred to the peripheral device control unit 34. It contains a 16-bit storage unit 31 address of a device control block (DCB) to be used by the peripheral device control unit 34 to control further operations.

The Start Cycle Steal Status command initiates a cycle steal operation for the addressed device 33. Its purpose is collecting status information relative to the previous cycle steal operation. The immediate field of the IDCB is transferred to the peripheral device control unit 34, and contains a 16-bit address of a DCB.

The Halt I/O command is an I/O control logic 32 directed command that causes a halt of all I/O activity on the I/O interface 35. No data is associated with this command. All pending device interruptions are cleared. Device priority interruption level assignments and device masks (I-bits) are unchanged.

FIG. 8 depicts the contents of register 97 of FIG. 5 and register 111 of FIG. 6 and the timing of signals on various lines of the interface 35. This represents the initial action when an OIO program instruction is decoded, whether for DPC Read or Write, transfer of the DCB address for cycle steal operations, or transfer of interrupt level codes for a Prepare command. The Data Bus 50 will be energized with the data being transferred between the device 33 and the immediate field of the IDCB in storage unit 31 that was addressed by the Operate I/O instruction.

Address bus 49, bits 0–15 contain the first word of the IDCB. The Address bus 49 is active prior to the rise of Address Gate 51 and until the fall of Address Gate Return 52. Equality between the wired device address and bits 8–15 of the Address bus 49, with bit 16 is a binary 1, constitutes initial selection of a peripheral device control unit 34. Bit 16 is added to the Address bus 49 by the Interface Gate control 76 of FIG. 4 from a decoder 112 to distinguish use of the address bus 49 for I/O operations as opposed to other operations using the address bus 49.

Address Gate 51 is the outbound tag used to signal the device 33 to respond to initial selection and begin the operation specified by the command (bits 0–7 Address Bus).

Address Gate Return 52 is the tag raised by the peripheral device control unit 34 to signal the I/O control logic 32 that is has received Address Gate 51, has recognized its address, and has activated status information on the Condition Code in Bus 53. This tag must rise within a certain time limit of the rise of Address Gate 51 as seen at the output of the channel. If not, condition code O is returned to the I/O control logic 32 and the sequence is terminated. Address Gate 51 falls and the Address Bus 49 is cleared.

The Condition Code In bus 53 is a three bit field that is binary encoded. The I/O device 33 passes status to the channel on this bus during the Address Gate Return tag time. The condition code bits are placed into the current level status register (LSR) of the CPU 30. The condition code values and meaning are shown in TABLE I.

TABLE I

| CC Value | Meaning |
|---|---|
| 0 | Device not attached |
| 1 | Busy |
| 2 | Busy after reset |
| 3 | Command reject |
| 4 | Intervention required |
| 5 | Interface data check |
| 6 | Controller busy |
| 7 | Satisfactory |

Data Strobe 54 is an outbound signal generated by the I/O control logic 32, and may be used by the device to register data being sent to the device. Data Strobe 54 falls with the fall of Address Gate 51.

Figure 9:
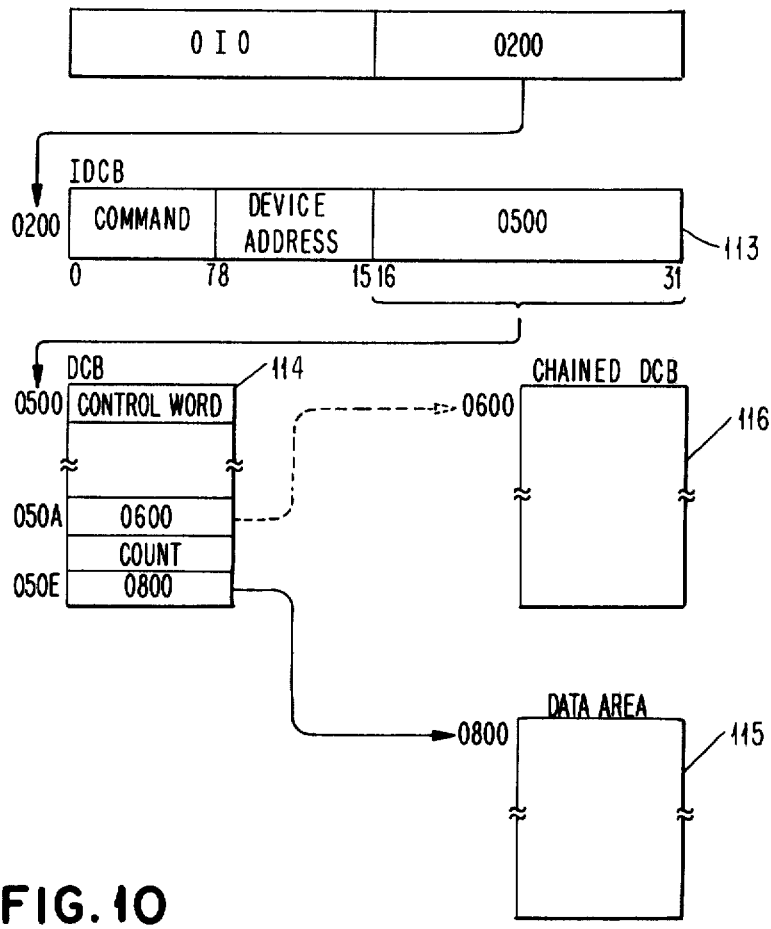
FIG. 9 represents the interaction and contents of, an operate I/O instruction (I/O), immediate data control block (IDCB), data control block (DCB), and data transferred in accordance with the present invention.
Figure 10:
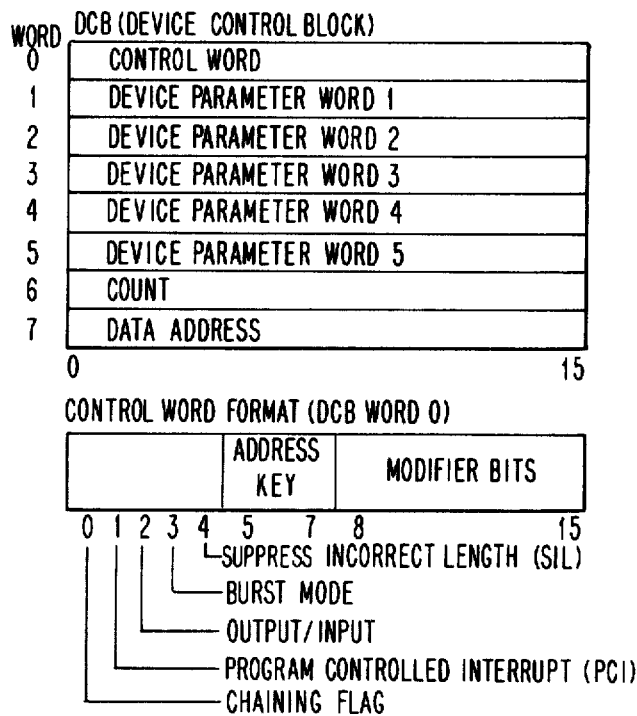
FIG. 10 is a representation of the contents of a data control block and control word within a data control block stored in main storage of a data processing system utilized for controlling I/O operations in accordance with the present invention.
Figure 11:
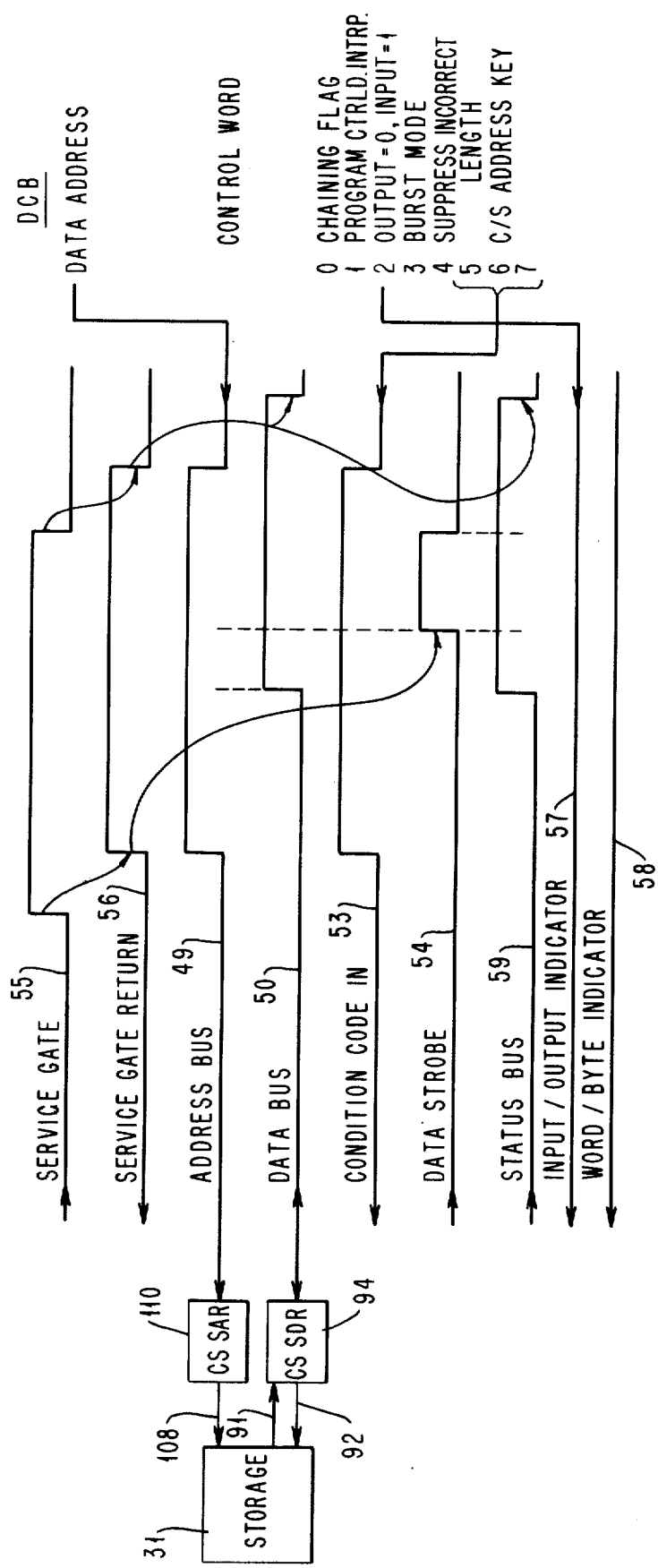
FIG. 11 is a representation of the I/O interface bus lines and timing involved in transfer of data on a cycle stealing (C/S) basis between a data processing system storage unit and peripheral device control unit in accordance with the present invention.

FIGS. 9, 10 and 11 will be utilized to describe further details of cycle steal input/output operations. In FIG. 9, the decoding of an OIO instruction with storage unit address 200 will cause the processor 30 to address and access from location 200 in the storage unit 31, the two words of the IDCB 113. The IDCB will be transferred to the peripheral device control unit 34 selected by the device address portion of the IDCB in accordance with the sequence shown in FIG. 8. The immediate field of the IDCB identifies and provides the address of the location of a device control block (DCB) 114 in the storage unit 31. The command Start Cycle Steal or Start Cycle Steal Status will be decoded in the peripheral device control unit 34 and initiate a first cycle steal operation using the address information 500 to the storage unit 31 for the purpose of transferring the DCB 114 to the peripheral device control unit 34.

The DCB contents will identify the address in storage unit 31 involved with the data transfer, and as depicted in FIG. 9, it is shown to be located at address 800 in the storage unit 31, thereby defining a data area 115. The amount of data to be transferred is specified by a byte count field. At the completion of the transfer controlled by DCB 114, an additional DCB, identified as a chained DCB 116, may be transferred to the peripheral device control unit 34 to provide further control for the previously selected peripheral device 33. As shown in FIG. 9, DCB 114 contains control information providing the address in storage unit 31 of chained DCB 116 which is located in the storage unit 31 beginning at address 600.

During Cycle Steal operations, each of the eight words which comprise a DCB is transferred to the previously selected peripheral device control unit 34 on a cycle steal request basis. FIG. 10 depicts the contents of a DCB contained either in the storage unit 31 or as received by a peripheral device control unit 34 in response to utilization of the IDCB information, which in turn was transferred in response to the OIO instruction.

The DCB is an eight word control block residing in the supervisor area of storage unit 31. It describes the specific parameters of the cycle stealing operation. The peripheral device control unit 34 fetches the DCB using storage protect key zero. The following describes the contents of the Control Word of each DCB.

If bit 0 is equal to one, a DCB chaining operation is indicated. After satisfactorily completing the current DCB operation, the device does not interrupt (excluding PCI interruptions). Instead, the device fetches the next DCB in the chain.

If bit 1 is equal to one, the device presents a programmed controlled interruption (PCI) at the completion of the DCB fetch. A pending PCI does not inhibit data transfers associated with the DCB. If the PCI is pending when the device encounters the next interrupt causing condition, the PCI condition is discarded by the device and replaced with the new interrupt condition.

The setting of bit 2 tells the device the direction of data transfer; 0 = Output (main storage to device) and 1 = Input (device to main storage). For bidirectional data transfers under one DCB operation, this bit must be set to one. For control operations involving no data transfer, this bit must be set to zero.

If bit 3 is equal to one, the transfer of data takes place in burst mode. This mode dedicates the channel and I/O interface to the device until the last data transfer associated with this DCB is completed.

If bit 4 is equal to one, an incorrect length record is not reported. The device continues the operation. The classes of incorrect length record are: (1) a record that is longer than the specified count, and (2) a record that is shorter than the specified count. Reporting of incorrect length record may be suppressed for one or both classes depending on the individual device.

Bits 5–7 are the cycle steal address key. This key is presented by the device during data transfers. It is used to ascertain storage access authorization.

Bits 8–15 may be used to describe functions unique to a particular device.

Parameter words 1–3 are device-dependent control words and are implemented as required. If suppress incorrect length (SIL) is used by a device, parameter word 4 specifies a 16-bit storage unit address called the status address. This address points to a residual status block that is stored when the following two conditions are met: (1) the SIL bit (bit 4 of the DCB control word) is set to one, and (2) All data transfers for the current DCB have been completed without error.

The size of the residual status block varies from one to three words depending on the individual device. The first word contains the residual byte count. Additional words (maximum of two) contain device dependent status information.

If suppress incorrect length is not used by a device, meaning of the device parameter word 4 is device dependent and has the same meaning as parameter words 1-3.

If the DCB chaining bit (bit O of the control word) is equal to one, Parameter Word 5 specifies a 16-bit main storage address of the next DCB in the chain. If chaining is not indicated, this parameter word is device dependent.

The count word contains a 16-bit unsigned integer representing the number of data bytes to be transferred for the current DCB. Count is specified in bytes with a range of 0 through 65,535. It must also be even for the start cycle steal status operation.

The data Address word contains the starting main storage address for the data transfer.

The cycle steal mechanism allows data service to or from an I/O device 33 while the CPU 30 is doing other processing. This overlapped operation allows multiple data transfers to be initiated by one operate I/O instruction. The CPU executes the Operate I/O instruction; then continues processing the instruction stream while the I/O device steals main storage 31 data cycles when needed. The operation always terminates with a priority interruption from the device. A poll tag 63 is generated by the channel to resolve contention between multiple devices requesting cycle steal transfers. The poll tag also resolves contention for priority interruptions on the same level.

All cycle steal operations include certain capabilities that are provided on a device feature basis:
1. Burst mode
2. Command chaining
3. Data chaining
4. Programmed controlled interruption (PCI)
5. Storage addresses and data transfers by byte or word All cycle steal operations terminate with a priority interruption.

The purpose of the Cycle Steal Start command is for data transfer. The purpose of the Start Cycle Steal Status command is to obtain residual parameters from the device if the previous cycle steal operation terminates due to an error or exception condition. The DCB format is the same as that for a normal cycle steal operation, with words 1-5 set to zeros.

During start cycle steal status operations, data is transferred to main storage 31 starting at the data address specified in the DCB. This data consists of residual parameters and device dependent status information. The first word transferred contains the main storage address of the last attempted cycle steal transfer associated with a Start command. if an error occurs during a start cycle steal status operation, this address is not altered. The residual address may be a data address, a DCB address, or a residual-status-block address and is cleared only by a power-on reset. It is updated to the current cycle-steal storage address upon execution of cycle steal transfers. For word transfers, the residual address points to the high-order byte of the word. Device reset, Halt I/O, machine check, and system reset have no effect on the residual address in the device.

The second status word transferred contains the residual byte count of a device. The residual byte count is initialized by the count field of a DCB associated with a Start command, and is updated as each byte of data is successfully transferred via a cycle steal operation. It is not updated by cycle-steal transfers into the residual status block. The residual byte count is not altered if an error occurs during a start cycle steal status operation.

It is reset by (1) power-on reset, (2) system reset, (3) device reset, (4) Halt I/O, and (5) machine check condition. The contents of the device cycle-steal-status word 1 are device dependent if the device does not: (1) implement suppress incorrect length (SIL), or (2) store a residual byte count as part of its cycle-steal status.

Other device dependent status words can be transferred depending on the device type. Two conditions can cause bits to be set in the device dependent status words.
1. Execution of an I/O command that causes an exception interruption.
2. Asynchronous conditions in the device that indicate an error or exception.

The bits are reset as follows:
1. For the first condition listed above, the bits are reset by the acceptance of the next I/O command (except Start Cycle Steal Status) following the exception interruption. These bits are also reset by a power-on reset, system reset, or execution of Halt I/O command.
2. For the second condition, the bits are reset on a device dependent basis.

FIG. 11 depicts the Interface 35 lines used and timing during cycle steal operations. Prior to this operation, the device had sent a cycle steal request (Bit 16 on the Request in bus 61), to the I/O control log in 32 which responded with the Polling sequence, and this device captured that poll.

Service Gate 55 is raised by the I/O control logic 32 to indicate to the device 33 that captured the poll 64, and signalled Poll return 65, that data transfers may begin.

When the device detects Service Gate 55 it sends Service Gate Return 56 to the channel 32 to indicate that it has placed the necessary data and control information on the I/O interface 35. Any data provided by the device for the transfer, is activated no later than the rise of this tag line. This tag line may fall no sooner than the fall of Service Gate 55 and Data Strobe 54 as seen at the output of the I/O device.

The address Bus 49 contains the storage unit 31 address that is used for the data word to be transferred. The contents of the Address bus are gated to the Cycle Steal SAR 110 in the Address card 41. A storage cycle takes place and the word is placed into the Cycle Steal SDR 94. The Data Bus 50 contains the word being transferred.

The Condition Code In bus 53 contains the Address key to be used during the storage unit 31 access. Condition Code In bits 0, 1, 2 correspond to bits 0, 1, 2 of the address key. This bus is activated with the rise of Service Gate Return 56 and is maintained till the fall of Service Gate 55.

Data Strobe 54 is an outbound tag and may be used by the device to register data being sent to the device. Data Strobe 54 falls with the fall of Service Gate 55.

The Status Bus 59 is used by the I/O control logic 32 to signal the peripheral device control unit 34 in the event an error is detected during cycle steal operations. The bits of this bus have the following meaning:
Bit 0 Storage Data Check
Bit 1 Invalid Storage Address
Bit 2 Protect Check
Bit 3 Interface Data Check If this bus is activated, the device retains the information for presentation in an Interrupt Status Byte at interruption time. The cycle steal operation is terminated and the device presents an end interruption.

If the device had already raised Cycle Steal Request for the next transfer, or is in Burst Transfer mode, it must complete one more servicing over the interface. This servicing is a dummy cycle where no device held parameters are updated or any status bits accumulated.

The Input/Output Indicator 57 tag = 0 indicates to the I/O control logic 32 that the operation is an output from storage 31, and = 1 indicates an input to storage 31.

The Word/Byte Indicator 58 tag = 0 indicates to the I/O control logic 32 that a word transfer is to take place, and = 1 indicates a byte transfer.

POLLING

Figure 12:
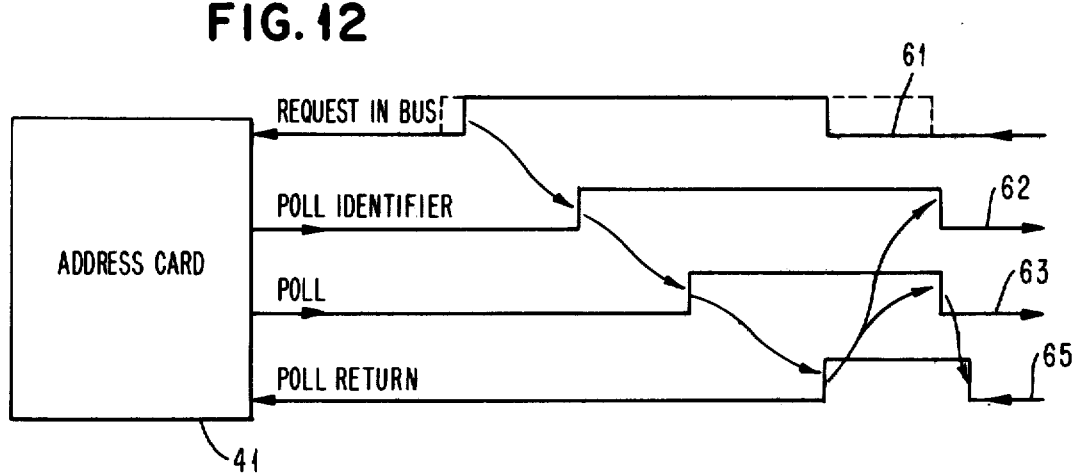
FIG. 12 is a representation of the I/O interface bus lines and timing for polling of peripheral device control units to initiate further communication on the interface bus in accordance with the present invention.

FIGS. 12 through 14 generally depict the polling concept in accordance with the present invention. The polling logic is common to the selection of peripheral device control units 34 in response to either interrupt requests or cycle steal requests. In accordance with the sequence shown of FIG. 12, the Request In Bus 61 is energized by any peripheral device 33 on the Interface Bus 35 which requires interrupt handling or use of the bus 35 for cycle steal data transfers. The line labeled "Bit 16" of the Request In Bus 61 is energized whenever any device requires cycle steal data transfers. The remaining lines of the request in bus 61 are each associated with a particular interrupt level. The energization of lines on the Request In Bus 61 will remain at a steady state value as long as any device requires servicing for interrupt or cycle steal transfers.

At the time the I/O control logic 32 determines that any of the requests on the Request In Bus 61 should be acknowledged, the signal lines of the poll identifier bus 62 will be energized in a coded fashion to indicate to all devices that a poll and selection process is being initiated either for cycle steal transfers or interrupt handling at a particular interrupt level identified by the poll identifier bus 62. After the poll identifier bus 62 is energized, a poll signal 63 is serially generated to all peripheral device control units 34 on the bus 35 to resolve contention between peripheral device control units 34 requesting interrupts on the same priority level and cycle stealing requests. Each peripheral device control unit 34 receives the poll tag 63 and redrives, or propagates, it to the next peripheral device control unit 34 by sending poll propagate if the device does not capture the poll. If a particular device control unit 34 has requested service of the type identified by the poll identifier bus 62, it responds with the poll return signal on line 65, and the poll signal 63 is not propagated to any further peripheral device control units 34.

In FIG. 13, there is shown a representation of three peripheral device control units 34 all having interrupts pending. The first device is indicating a request to interrupt at level 2 while the remaining devices are requesting interrupts at level 1. The poll identifier bus 62 will be coded to specify a poll for any device making a request at level 1. Since the poll identifier bus 62 is not equal to the request at level 2 by the first device, the poll signal 63 will be propagated to the next following device. The first device signifying a request at level 1 captures the poll, and degates the poll propagate signal to the next following devices. At the same time, the first level 1 device will generate the poll return signal 65 for informing the I/O control logic 32 that the poll has been captured. The I/O control logic 32 will respond with service gate 55, the device responds to the service gate 55 with service gate return 56 and starts utilization of the interface bus 35.

As shown in FIG. 13, the polling signal which is serially propagated from device to device is in fact two separate signals labeled poll 63 and poll prime 64. The internal logic for each of the peripheral device control units 34 generates an internal poll signal in response to receipt of a signal on both the poll input line 63 and poll prime input line 64. This feature permits the proper functioning of the polling mechanism even though a particular peripheral device control unit 34 is physically removed from the interface bus 35. In the extreme all alternate peripheral device control units 34 may be physically removed.

FIG. 14 shows additional detail of the internal logic of a peripheral device control unit 34 utilized in receiving poll signals 63 and 64, and generating the poll return signal 65. An AND circuit 117 receives both the poll signal 63 and poll prime signal 64, received on first and second inputs respectively. The output of AND circuit 117 on line 118 is the internal poll signal. An AND circuit 119 and a compare circuit 120 determined from the present device interrupt level or cycle steal request indication on a line 121, and the coded information on the poll identifiers bus 62 whether or not the particular device shown should capture the poll and generate a poll return signal 65 from AND circuit 122.

The output of either Compare Circuit 120 or AND circuit 119 will be effective at the AND circuit 122 along with an internal poll signal 118 to generate the poll return signal 65 and inhibit operation of the poll propagate logic to a next following device.

AND circuit 117 is shown to have, on each of the first and second inputs, a resistor 123 connected to a positive voltage. The poll line 63 and poll prime line 64 will normally be held at negative, ineffective levels, in the absence of the generation of the respective signals. If the next preceding peripheral device control unit 34 were removed from the interface bus 35, the resistor 123 to the positive voltage supply will clamp the first input of AND circuit 117 to a positive level indicating a normal poll signal on line 63. At this time, receipt of the poll prime signal on line 64 from a peripheral device control unit 34 next preceding the peripheral device control unit 34 removed from the interface bus, will combine with the clamped first input of AND circuit 117, and be effective to generate the internal poll on signal line 118. If the peripheral device control unit 34 generating the poll prime signal 64 were removed from the bus 35, the second input to AND circuit 117 would be clamped, and AND circuit 117 would respond to the poll signal 63 from the next preceding device control unit 34.

PERIPHERAL DEVICE CONTROL UNIT

Figure 15:
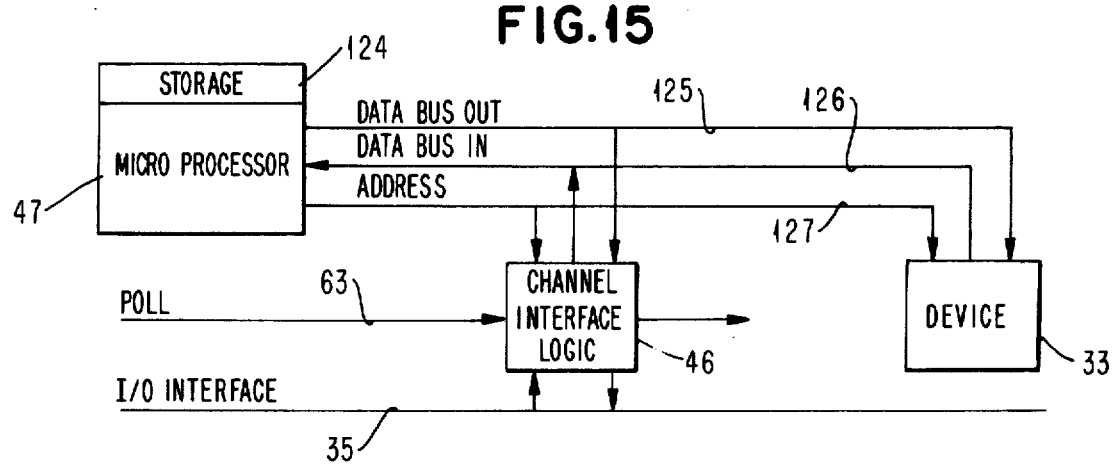
FIG. 15 is a representation of the major components of a peripheral device control unit attached to an I/O interface bus of the present invention.

FIG. 15 depicts in slightly more detail the arrangement of the major parts of a peripheral device control unit 34 shown in FIG. 3. The channel interface logic 46 is connected in parallel with other channel interface logic to the interface 35, and also receives the serially transmitted poll signal 63. In certain situations, the channel interface logic 46 could contain all of the combinatorial and sequential logic required to directly control a device 33. However, in a preferred embodiment of the present invention, basic control for the peripheral device control unit 34 is effected by a microprocessor 47 which includes its own storage 124 for programs, data, and peripheral device control information. The transfer of data, control, and sense information is effected by the microprocessor 47 data bus out 125, data bus in 126, and address bus 127. The microprocessor 47 instruction set includes OP codes and address information wherein the address information on bus 127 identifies particular registers, triggers, latches, and gates within the peripheral device control unit 34 to be effected or sensed.

FIG. 16 shows the major components of the channel interface logic 46 as connected to the interface bus 35 and microprocessor 47 busses. The major units include data register byte 0 with parity check and parity generate, and byte 1 of the data register with parity check and parity generate. Interrupt and cycle steal sequencing is controlled in logic which includes checking of priority level and poll identification. Further logic includes byte 0 of an address register, which as previously discussed carries the command for a device and therefore also includes a command decode mechanism. Other logic receives byte 1 of the address information, which as previously discussed, addresses a particular device which is compared with a wired address on address jumpers. There is logic that includes the cycle steal status register, condition code generation and other reset and interface controls. There is a decoder for the address information from the microprocessor which is effective to control and sense various latches in the peripheral device control unit 34.

FIG. 17 shows a block diagram of the major components of a microprocessor 47 suitable for use in the peripheral device control unit 34. The previously mentioned storage 124, output and input data busses 125 and 126, and address bus 127 are shown. The microprocessor is controlled by the entry of 16-bit instructions into an OP register 128, the OP code portion of which is utilized by cycle control 129 and a timing clock 130 to generate necessary control signals within the microprocessor. The storage 124 is accessed by address information from a storage address register (SAR) 131 which receives address information from several sources. These sources include address information in instructions contained in the OP register 128, an instruction address register 132, a link register 133, and from instruction addressable data address register (DAR) stack 134. In combination with the instruction address register 132 and link register 133, a backup register 135 and incrementer 136 provide the necessary controls for controlling sequence of programmed instruction execution, including branch, branch and return, branch and link types of sequence controls.

A further addressable register stack 137 and data from storage 124, presented through an assembler or multiplexor 138, can be stored in an A register 139 and/or B register 140. Registers 139 and 140 provide input to arithmetic and logic unit 141, and are the registers utilized for transfer to data utilizing the Data Bus Out 125 or Data Bus In 126.

Figure 18:
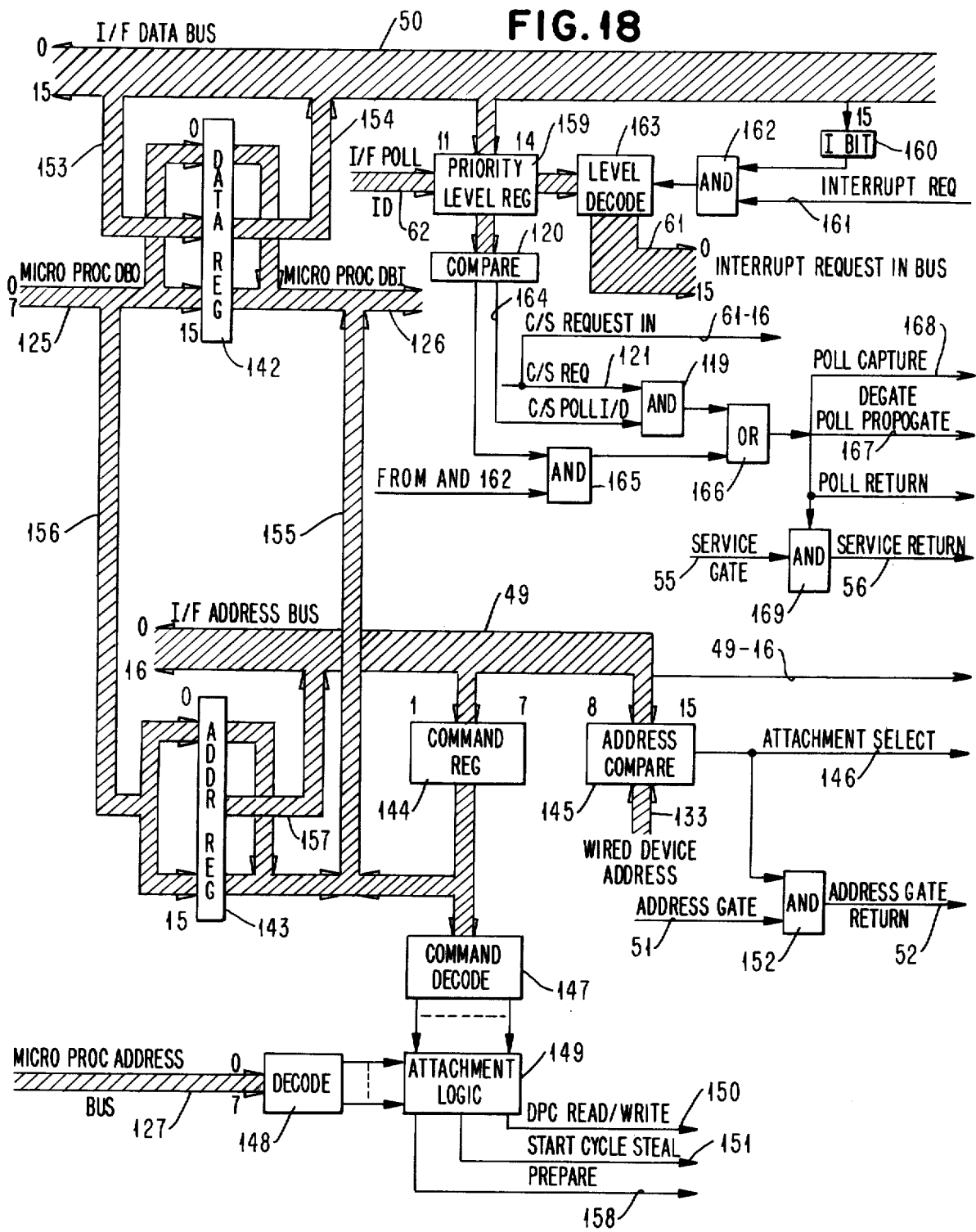
FIG. 18 is a block diagram representation of the interconnection of various data busses of a microprocessor and I/O interface within the device control logic of a peripheral device control unit in accordance with the present invention.

FIG. 18 shows additional detail of the channel interface logic 46 discussed briefly in connection with FIG. 16. As the result of a decode in the processor 30 of an OIO instruction, the I/O control logic or channel 32 must communicate with the peripheral device control units 34 to utilize the interface bus 35 to transfer the immediate data control block (IDCB). The channel interface logic 46, whether controlled by a microprocessor 47 in accordance with a preferred embodiment, or by combinatorial and sequential logic must include a number of basic elements, and these include a 16-bit data register 142, address register 143, command register 144, and attachment or device selection address compare circuit 145.

As indicated earlier, the interface address bus 49 carries the first word of the IDCB which includes the device command in bits 0 through 7 and the device address in bits 8 through 15. An initial selection of all peripheral device control units 34 is made by bit 16 of the address bus 49 to distinguish use of the bus for I/O operations as opposed to other operations. The initial device or attachment selection is made by comparing the device address in bits 8 through 15 on the address bus 49 with the wired device address 133 in the address compare circuit 145 to provide an initial device or attachment selection signal on line 146. The recognition of the device address will cause bits 1 through 7 on the address bus 49 to be gated into the command register 144 for presentation to a command decoded circuit 147. The microprocessor address bus 127 is decoded in a decode circuit 148. The decoder 148 output is combined with the decoder 147 output in attachment logic 149. For data transfer operations, either a first or second output signal on lines 150 and 151 will indicate a direct program control transfer or a cycle steal transfer respectively.

The initial device or attachment select signal 146 provides one enabling signal to an AND circuit 152 which responds to the I/O control logic generated address gate 51 to generate an address gate return signal 52. In response to the address gate return signal 52, the I/O control logic 32 is informed of the device selection.

The 16-bit data register 142 is interconnected to the interface data bus 50 by busses 153 and 154. The 16-bit data register 142 communicates with the 8-bit microprocessor data bus out 125 or the data bus in 126, in two separate cycles in response to control from the microprocessor. In the case of a direct program control read operation, the data register 142 will have received the data from the microprocessor data bus out 125 for presentation to the interface data bus 50 over bus 154. If the DPC operation is to write data, the contents of the interface data bus 50 would have been placed in the data register 142 over the bus 153 for subsequent presentation, in two separate cycles, to the microprocessor data bus in 126.

If the immediate data control block command portion has called for a Start Cycle Steal operation, the contents of the data register 142 received by bus 153 contains address information which will be transferred over the microprocessor data bus in 126, to the storage 124 of the microprocessor shown in FIG. 17. Further, in response to the decoding of a Start Cycle Steal Operation, the contents of the command register 124 will be transferred by a bus 155 to the microprocessor data bus in 126 for storage in the storage 124 of the microprocessor. Therefore, the storage 124 of the microprocesor will be utilized as command storage and storage unit 31 address storage for the purpose of controlling subsequent cycle steal data transfer operations.

During subsequent cycle steal transfer operations, the address register 143 will receive on a bus 156 in two consecutive cycles, from the microprocessor storage 124, the previously stored storage unit 31 address information. This address information on subsequent cycle steal data transfer operations will be transferred over a bus 157 to the interface address bus 49 for presentation to the address mechanism of the storage unit 31 of the central processing unit. The data register 142 will contain the data of a cycle steal transfer whether for a read or write operation.

A third type of command received in the immediate data control block is a prepare command signalled on a line 158. In response to a prepare command signalled on line 158, bits 11 through 14 on the interface data bus 50 will be stored in a priority level register 159, and the previously mentioned I bit 15 will be stored in a trigger 160. The contents of the priority level register 159 signify the priority level of the device when interrupt requests must be made. An interrupt requires signal on line 161, initiated by the attached microprocessor 47, will be effective at an AND circuit 162 if the I bit stored in 160 is a binary 1. This signifies that the device may interrupt at any level. If the device can interrupt, and an interrupt request has been made on line 161, a level decoder 163 will be rendered effective to energize one of the signal lines on the interrupt request in bus 61. The line energized will be associated with the priority interrupt level registered in the priority level register 159.

As previously discussed in connection with FIG. 14, the I/O control logic 32 responds to any signal on the request in bus 61, whether for an interrupt request or a cycle steal request signalled on a line 61-16, by initiating a polling sequence. The polling sequence includes the transmission of the poll identification on bus 62 to all attached peripheral device control units 34 along with the serially transmitted poll signal 63. If the poll identification on bus 62 indicates a poll for any device requesting a cycle steal transfer, a signal on line 164 will be generated. This enables AND gate 119, to produce an output if the device shown in FIG. 18 has requested a cycle steal transfer as indicated on line 121.

If the poll identification bus 62 is coded with a priority interrupt level which compares with the present level assigned as indicated in register 159, and the device shown in FIG. 18 has requested an interrupt, as indicated by an output from AND circuit 162 a signal from an AND circuit 165 will be generated. OR circuit 166 will generate an output signal in response to an output of AND circuit 119, or the output of AND circuit 165 to degate propagation of the poll to succeeding peripheral device control units 34, which signal is shown at 167. Other logic of the peripheral device control unit 34 of FIG. 18 will be signalled of the poll capture on a line 168. Further, an AND circuit 169 will be enabled to thereby cause the peripheral device control unit 34 to respond to the service gate signal 55 on the interface 35 by generating the service gate return signal 56 for the purpose of controlling further transfer on the interface bus 35.

Figure 19:
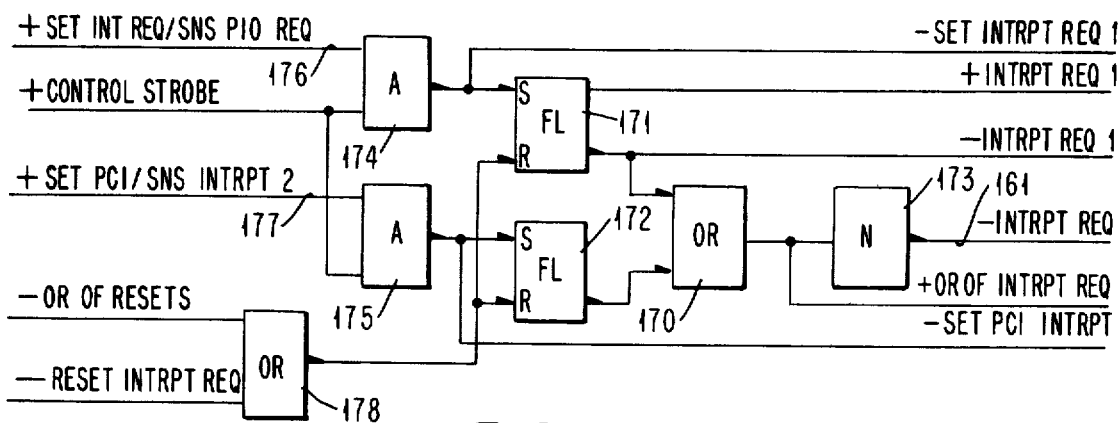
FIG. 19 is a detailed logic diagram of the manner in which a peripheral device control unit initiates an interrupt request to a central processing unit utilizing the interface bus of the present invention.
Figure 20A:
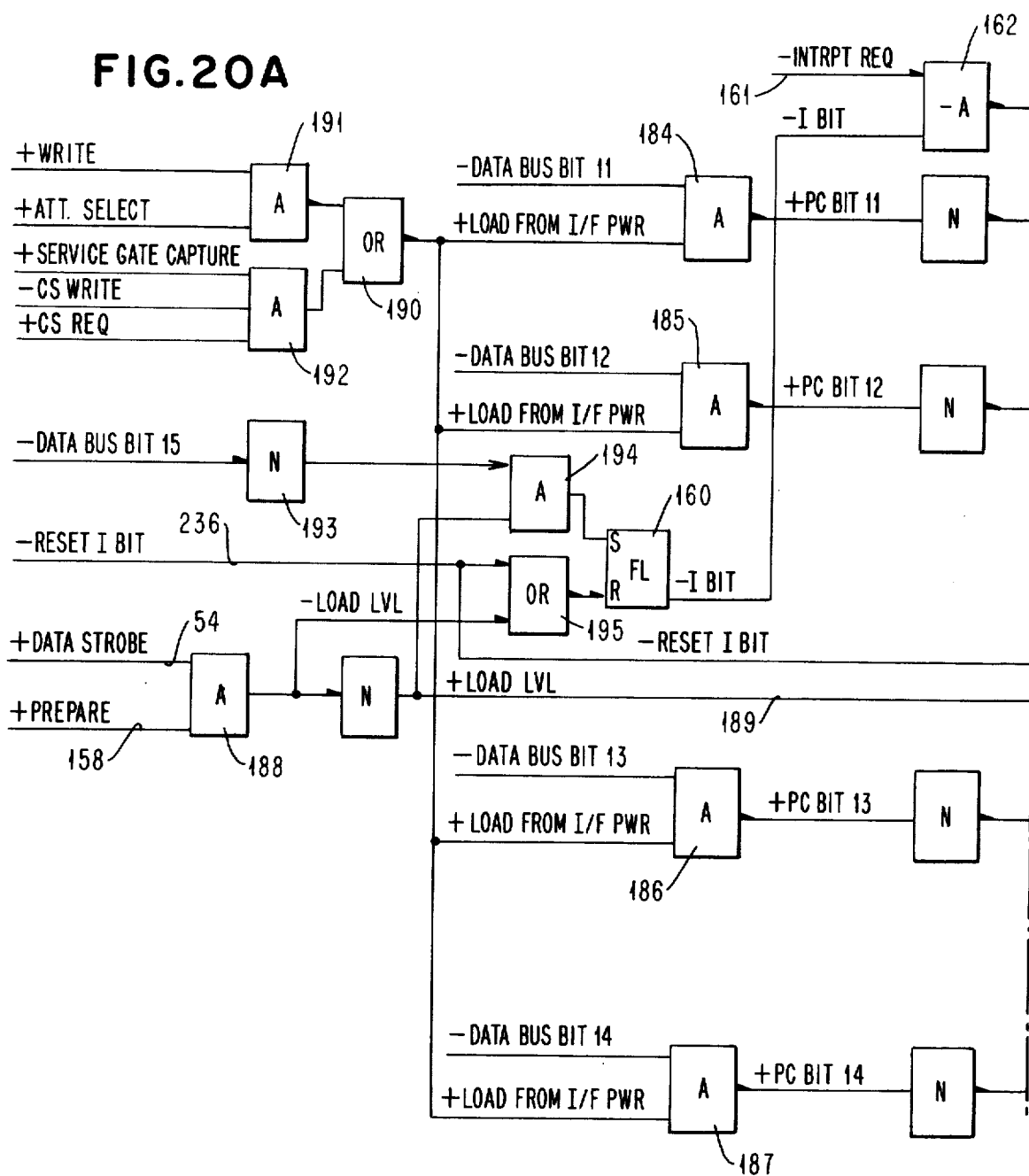
Figure 20:
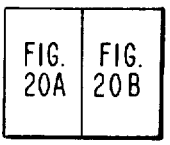
FIG. 20 shows how
Figure 21A:
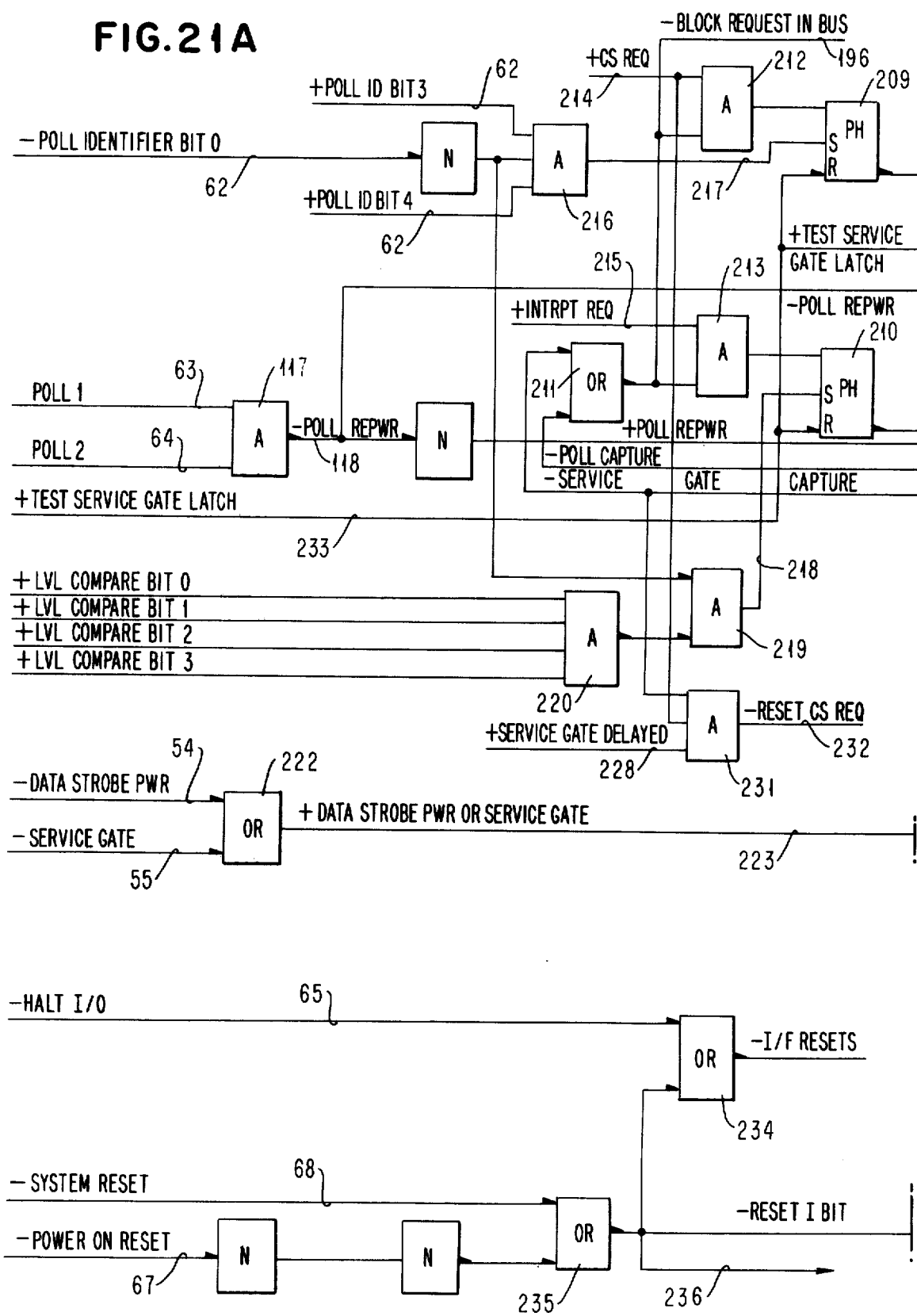
FIGS. 21A and 21B are to be arranged to show a detailed logic diagram of the poll receiving, propagating, and capture means of a peripheral device control unit in accordance with the present invention.
Figure 21B:
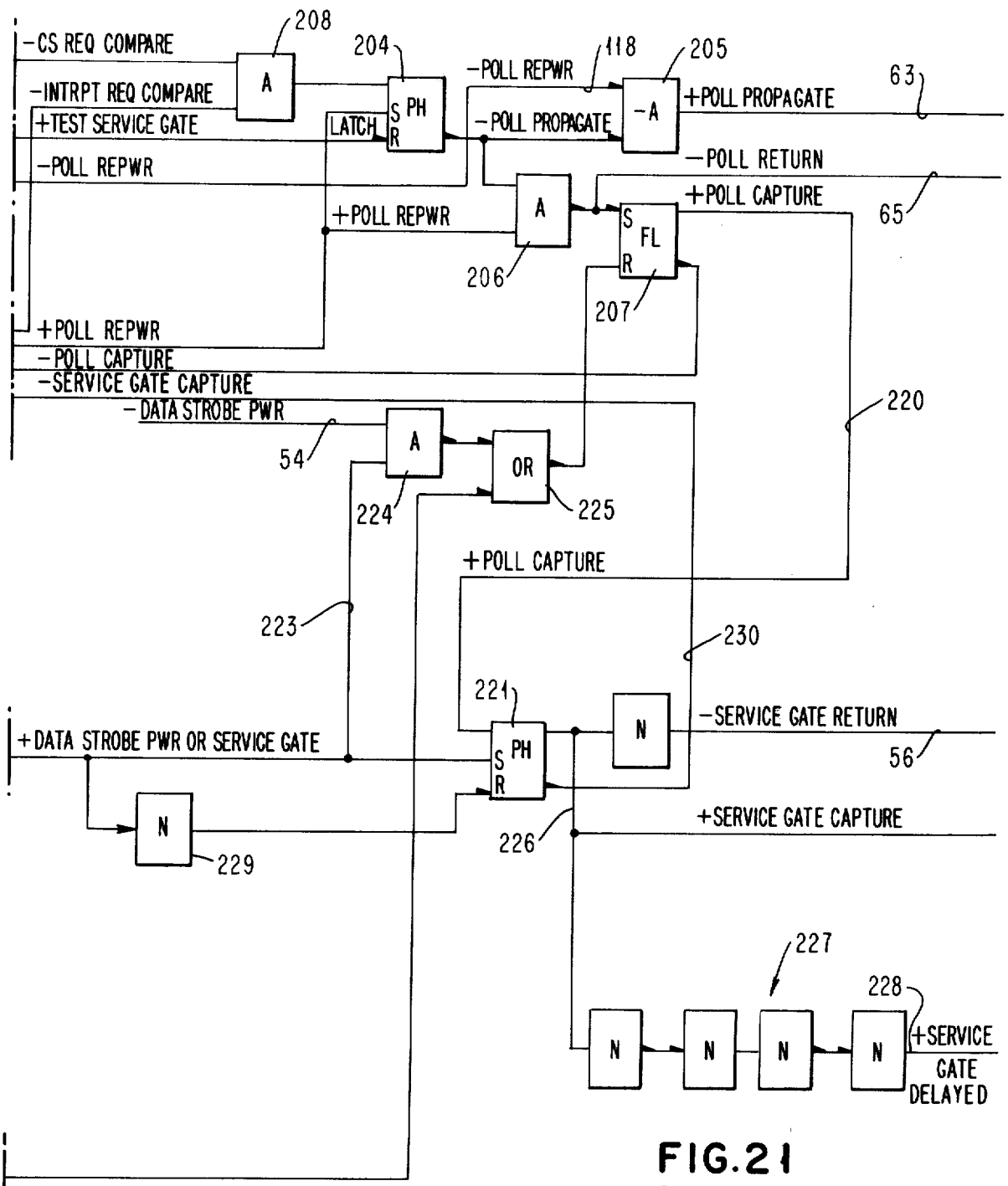
Figure 21:
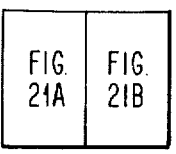
FIG. 21 shows how

FIGS. 19, 20, and 21 show further details of the logic of the channel interface logic 46 discussed in connection with FIG. 18. Various logic blocks shown include AND (A), OR (OR), inverters (N), Exclusive OR (EOR), and various bistable storage elements in the form of triggers, flip-flops, latches, and priority hold circuits. Signal lines entering a particular logic block with a solid arrow or exiting a logic block with a solid wedge indicate that the line or block is effective, or true, when the line is at a negative voltage level. In the alternative, the absence of the solid arrow or wedge indicates that the line or block is effective or true when the line is at a positive level.

In FIG. 19, the signal line interrupt request 161 shown in FIG. 18 is shown generated from an OR circuit 170 which receives inputs from bistable devices 171 and 172. An inverter 173 provides an inverted signal representing the interrupt request to other logic of the channel interface logic. A control strobe from the microprocessor 47 samples an AND gate 174 and an AND gate 175, the outputs of which set bistable devices 171 and 172 respectively. Input 176 of AND 174 is a signal line generated from the decoder 148 of FIG. 18 in response to microprocessor address bus 127 and reflect the microprocessors determination that the attached device requires attention from the processor 30. As previously mentioned, certain data control blocks in a chain of data control blocks of cycle steal operations may include a PCI bit indicating a program controlled interrupt during chaining operations to allow the processor 30 to sample the progress of cycle steal operations. Detection by the microprocessor of the PCI bit will cause energization of a signal line 177 thereby enabling AND 175 to set device 172. Either of these two cases, as reflected by AND's 174 or 175, will be effective to initiate an interrupt request by the peripheral device control unit 34. An OR circuit 178 will be effective to reset bistable devices 171 and 172, and receives as inputs, signal lines generated in response to a number of conditions requiring reset of the interrupt request. These conditions include the fact that the service gate 55 on the interface bus 35 has fallen indicating that the previously acknowledged interrupt request has been completed or that the peripheral device control unit 34 has received certain other signals on the interface bus 35 such as Halt I/O, or system reset.

FIGS. 20A and 20B, when arranged in accordance with FIG. 20 show further detailed logic of previously mentioned blocks of FIG. 18 relating to the energization of the interrupt request in bus 61, loading of a priority level in the priority level register 159 and comparing the contents of the priority level 159 with coded information on the interface poll identification bus 62 in compare circuit 120. The priority level register 159 of FIG. 18 is represented by polarity hold circuits 180 through 183. Associated AND circuits 184 through 187, through inverters, set into the polarity hold circuits 180 through 183 the binary state of interface data bus 50 bit positions 11 through 14 which are coded with the priority level to be established in the priority level register in response to a Prepare Command.

The signal on line 158, indicating a Prepared Command, is generated by the command decode 147 of FIG. 18 when the IDCB command calls for entry of priority levels into the priority level register 159. The data strobe 54 received from the interface bus 35 is applied to an AND circuit 188 to generate a signal on line 189 indicating that the level register 159 is to be loaded.

Another condition required for loading of the priority level information is indicated by an output from OR circuit 190 and AND circuits 191 and 192. This condition is that the command is a write command and the device address has compared indicating a device select, and that the particular device control unit is not presently engaged in a cycle steal data transfer.

An inverter 193 and AND circuit 194 receive bit position 15 of the I/O data bus 50 which is entered into latch 160 previously mentioned in FIG. 18 as being the I bit, or interrupt enable, bit for the peripheral device control unit. Trigger 160 will first be reset by an OR circuit 195 and then set to the binary 1 or 0 state of the data bus bit 15. OR circuit 195 also receives an input which resets the I bit in response to a system or power on reset from the interface bus 35.

The AND circuit 162 previously mentioned in FIG. 18 is again shown in FIG. 20 and is shown to receive the state of the I bit and the interrupt request signal 161 generated from FIG. 19. In the absence of a signal on line 196, labeled block request in bus, applied to AND circuits 197 and 198, each receiving the complementary values of level register bit 0, a decoder 199 will present to the interrupt request in bus 61, an energization of a particular one of the lines in accordance with the priority level entered in polarity hold circuits 180 through 183. It is the gating of bit 0 to decoder 199 which energizes the decoder 199. The signal on line 196 indicating that the request in bus should be deenergized or blocked is received from FIG. 21, to be discussed subsequently, indicating that the peripheral device control unit 34 has accomplished a poll capture in response to an interrupt request, or a service gate capture in response to a cycle steal request. In the absence of these two signals to block energization of the request in bus 61, the request in bus will reflect a continuing interrupt request at a particular level assigned. Since a Prepare Command and Data Strobe can be received by a peripheral device control unit entirely under control of programming in the processor 30, the contents of the polarity hold circuits 180 through 183 can be modified at any time. Should there have been a previous energization of AND circuit 162 by an interrupt request, and in the absence of a previous poll or service gate capture, decoder 199 remains energized and will immediately be changed in accordance with any new coding of the priority level entered in the polarity hold circuits 180 through 183.

FIG. 20 shows Exclusive OR circuits 200 through 203 which signal a comparison between bits of the priority level register 159 and bits of the poll identifier bus 62 which will be utilized in the logic of FIG. 21 to effect a poll signal capture.

FIGS. 21A and 21B, when arranged in accordance with FIG. 21, depict the logic of the channel interface logic 46 of a peripheral device control unit 34 involved with receipt of poll and poll prime signals 63 and 64, and results of the compare of the bits of the pool identification bus 62 with the contents of the level register 159. This logic is for the purpose of capturing the poll signals 63, 64, with subsequent generation of the poll return signal 65, or propagation of the poll signal to further peripheral device control units 34.

Repeated in FIG. 21A is the AND circuit 117 of FIG. 14 which receives, on first and second inputs, the poll signal 63 and poll prime signal 64 to generate, in response thereto, an internal poll signal on line 118. The internal repowered poll signal 118 is applied to a polarity hold bistable device 204, the stable state of which is used to control effectiveness of an AND circuit 205 and an AND circuit 206, both of which receive the internal repowered poll signal 118. Depending on the state of the circuit 204, AND circuit 205 will generate the poll propagate signal, which is the poll signal 63 for succeeding peripheral device control units, or AND circuit 206 will be effective to generate the poll return signal 65, and indicate to internal logic of the peripheral device control unit the poll capture by setting the latch 207.

The state of the polarity hold circuit 204, to be indicated in response to the internal repowered poll signal 118, is controlled by an AND circuit 208 which responds to the state of polarity hold circuit 209 or polarity hold circuit 210. In the absence of an effective output from an OR circuit 211, which indicates that no poll capture or service gate capture has taken place, an AND circuit 212 and an AND circuit 213 will be enabled. AND circuit 212 will respond to a cycle steal request signal on line 214 from a trigger in other logic of the channel interface logic set by the microprocessor, to arm the polarity hold circuit 209. Likewise, in response to a signal on line 215 from AND circuit 162 in FIG. 20, AND circuit 213 will be rendered effective to arm polarity hold circuit 210.

The requirement for a cycle steal transfer, indicated on line 214, is also effective to energize bit 16 of the request in bus 61 presented to the I/O control logic 32. The I/O control logic 32 will respond to the cycle steal request by energizing the poll identifier bus 62 with a particular code combination. This code combination is recognized by an AND circuit 216 which responds to the binary 1 state of poll identifier bus 62 bit positions 0, 3, and 4. The basic indication of a cycle steal poll identification is bit position 0 of the poll identifier bus 62 which must be in the binary 1 state. When bit position 0 of the poll identifier bus 62 is in the binary 0 state, the remaining bit positions are decoded to indicate a particular priority level.

When AND circuit 216 is rendered effective in response to a poll identifier bus 62 indication of a cycle steal poll, polarity hold circuit 209 will be rendered effective by a signal on line 217 to indicate the existence of a cycle steal request on line 214 along with recognition of a poll for cycle steal operations.

Polarity hold circuit 210 will be gated by a signal on line 218 when an AND circuit 219 is rendered effective. AND circuit 219 will be rendered effective in the presence of a binary 0 at bit position 0 of the poll identifier bus 62 and an output from an AND circuit 220. AND circuit 220 is the logic which receives the outputs of Exclusive OR circuits 200 through 203 of FIG. 20 and is rendered effective when the code on the poll identifier bus 62 is equal to the priority level indicated in the priority level register 159 of FIG. 18.

A major portion of FIG. 21 therefore shows a poll receiving means which will either propagate a received poll signal to succeeding peripheral device control units, or capture the poll by setting latch 207 when a cycle steal request has been made and the poll identification bus indicates a poll for cycle steal request, or an interrupt request has been made, and the code on the poll identification bus 62 is equal to the priority interrupt level of the peripheral device control unit receiving the poll signal.

Capture of the poll signal in latch 207 will be effective at OR circuit 211 to block the request in bus 61 by means of a signal 196. The poll capture signal 220 from latch 207 will be effective to arm a polarity hold circuit 221. Polarity Hold circuit 221 which will subsequently respond to an enabling signal from an OR circuit 222, in response to receipt of a data strobe 54 or service gate 55. The signal 223 from OR circuit 222 will also be effective at an AND circuit 224, through an OR circuit 225, to reset the poll capture latch 207. Receipt of the signal 223 from OR circuit 222 by the polarity hold circuit 221, renders polarity hold circuit 221 effective to energize the service gate return signal 56 to the I/O control logic 32.

The polarity hold circuit 221 provides a signal 226 indicating service gate capture which is utilized in logic shown previously in FIG. 20, and is effective through a series of inverter circuits, each of which cause delay, to produce a signal 228 entitled service gate delayed. Until the polarity hold circuit 221 is reset by inverter 229, a signal on line 230 will be effective at OR circuit 211 to maintain the signal 196, blocking energization of the proper signal line on the request in bus 61.

An AND circuit 231 provides a signal on line 232 to reset the previously set cycle steal request trigger which will ultimately indicate to the microprocessor, when sensed, that the previously requested cycle steal transfer has been honored and that a further and subsequent cycle can be initiated. As a result, a signal on line 233 from the decoding of a particular microprocessor instruction will be effective to reset polarity hold circuits 204, 209, and 210 in preparation for further polling operations.

OR circuits 234 and 235 receive interface signals indicating halt I/O 65, system reset 68, or power on reset 67 to provide reset signals for the logic of the peripheral device control unit 34, including a signal on line 236 effective at OR circuit 195 of FIG. 20 to reset the I bit of the peripheral device control unit 34 preventing further interrupt requests.

There has thus been shown in FIGS. 19, 20, and 21, detailed logic of a peripheral device control unit 34. This logic is effective for the purpose of responding and reacting to a polling mechanism for either cycle steal data transfer operations or interrupt processing. Further, there has been shown the logic within a peripheral device control unit which can function independently of an interface bus being utilized for a direct program control of data transfer. An interface bus concept has also been provided in which the logic of a peripheral device control unit is capable of interaction with information on the interface bus for the purpose of changing the device priority interrupt level, independent of other operations which may be occurring on the interface bus, or operations initiated in response to previous commands previously directed to the device attached.

I/O CONTROL LOGIC

Further details of the I/O control logic 32 will now be discussed using FIGS. 22 through 26.

Figure 22A:
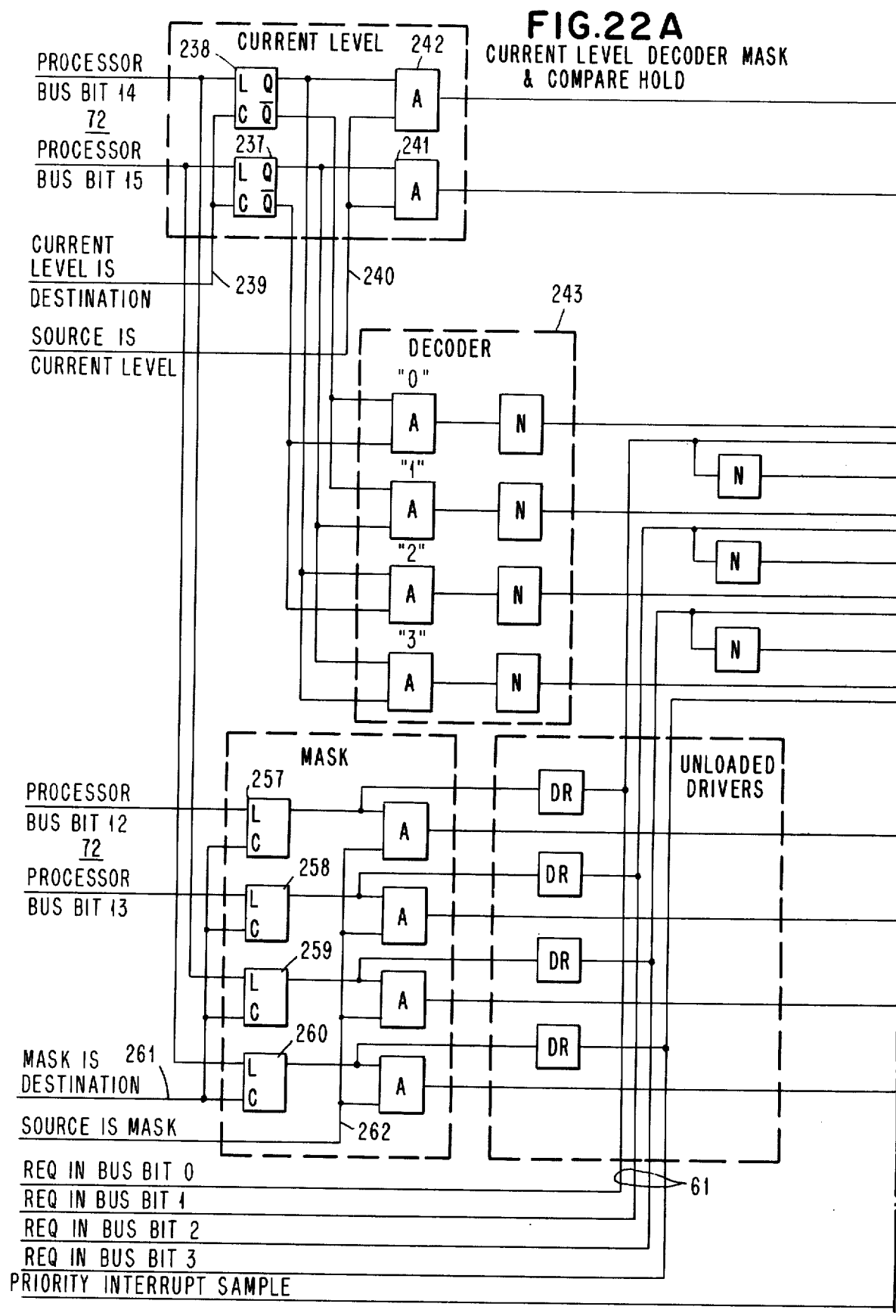

In a processor 30 which is capable of operating at four different levels of priority, the logic of FIGS. 22A and 22B, when arranged in accordance with FIG. 22, will determine if an interrupt request on the request in bus 61 signifies a request at a priority level higher or lower than the level currently effective in the processor 30.

The current operating level of the processor 30 will be signified on the processor bus 72 bit positions 14 and 15, and will be clocked into latches 237 and 238 by a program controlled signal on line 239. The program can sample the current level, for other purposes, by energizing a line 240 for sampling AND circuits 241 and 242 for presentation to bit positions 14 and 15 of the processor bus 72.

The current operating level is a coded representation in latches 237 and 238, and will be decoded by AND circuits of a decoder 243 to energize one of the four output lines of the decoder 243 identifying the current operating level.

The interrupt logic 69 shown in FIG. 4 includes AND circuits 244 through 247, the outputs of which will be entered into an associated latch 248 through 251 in response to a processor controlled signal on line 252 indicating that any priority interrupt request can at that point in time be sampled. Only one of the AND circuits 244 through 247 will be effective to set a binary 1 in the associated latch 248 through 251 at the time of the clock signal 252 depending on the decoder 243 output and the energized or deenergized state of bits 0 through 3 of the request in bus 61. The level outputs 253 through 256 will indicate to the I/O control logic 32 which interrupt level is to be polled. The level to be polled may be the current level stored in latches 237 and 238 or, if the request in bus is energized with a request at a higher level, the output of latches 248 through 251 will indicate the need to interrupt and poll for the higher level being requested.

A mask register comprised of latches 257 through 260 may be set to binary 1 or binary 0 conditions from bit positions 12 through 15 of the processor bus 72 in response to a processor generated signal on line 261. The contents of the mask latches 257 through 260 may be sampled through associated AND circuits by a processor generated signal on line 262 for presentation to the processor on processor bus 72. The effect of the mask latches 257 through 260, through associated drivers, attached to the request in bus 61 is to negate the effect of any request signal on the associated line of the request in bus 61. Therefore, under processor program control, any interrupt request at a particular level from an I/O device can be rendered ineffective.

Many processors have the ability to mask all I/O interrupt actions. Shown in detail here is a mask of interrupts at specified levels, and previous discussions of the peripheral device control unit 34 have shown a third level of masking in the form of the I-bit transferred with a Prepare command.

The poll sequence control 75 of FIG. 4 is shown in more detail in FIGS. 23A and 23B when arranged in accordance with FIG. 23. At a particular time in the processor 30 sequencing, the read only control store will decode a microinstruction indicating that an interrupt request should be acknowledged and such will be signalled on a line 263. The signal 263 is entered into a latch 264, and is effective to cause an encoder 265 output to be entered into a pair of latches 266 and 267. The contents of latches 266 and 267 will be the binary coded value of the one level signal line 253 through 256 energized from the interrupt priority determination logic of FIG. 22B.

The output of latch 264 on signal line 268 is applied as one input to contention resolution logic 269. Independent of the determination of the processor 30 to acknowledge an interrupt request, contention logic 269 receives any cycle steal request on request in bus 61 bit position 16.

The poll signal 63 is generated by the set condition of a Poll tag latch 270. If the poll tag latch 270 is not set, and therefore not generating a poll signal 63, an AND circuit 271 and an AND circuit 272 will render effective the contention resolution logic 269, and an interrupt precycle latch 273 and a cycle steal precycle latch 274. If the poll tag latch 270 is not active, the appropriate precycle latch 273 or 274 will be set in accordance with the contention logic 269, and will inhibit further change in the contention resolution logic 269.

An OR circuit 275 will be rendered effective by either an interrupt precycle or cycle steal precycle to provide one input to an AND circuit 276, the other input of which is the inactive state of a trigger 277, set by either a poll return signal 65 or burst return signal 60 through an OR circuit 278.

When AND circuit 276 is rendered effective, the output signal will set a poll start latch 279, which, after a suitable delay, will be effective to set the poll tag latch 270 to commence generation of the poll signal 63.

Before the output of the delay circuit 280 is effective at the poll tag trigger 270, the information on the poll identification bus 62 will have been energized in accordance with the output of an encoder 281. Encoder 281 receives inputs from the encoded value of the interrupt level registered in latches 266 and 267, and a signal on line 282 if a cycle steal cycle is going to be polled for. As previously mentioned, the cycle steal poll identification on bus 62 is a predetermined code which will be generated by the encoder 281 if a cycle steal poll is taking place. Otherwise, encoder 281 will provide a coded output on the poll identification bus 62 associated with the particular one of the interrupt level signals 253 through 256 energized, if an interrupt cycle is being called for.

Assuming that the service gate return signal 56 from a previous operation has fallen, and that the latches have not previously been set, either a latch 283 or a latch 284 will be set in accordance with whether or not the interrupt precycle latch 273 or cycle steal precycle latch 274 has previously been set. The signal on line 285 or a signal on line 286 will be generated to further logic of the I/O control logic. Also, the output of an OR circuit 287, on line 288, will be generated to initiate a request to the interface gate control 76 of FIG. 4, to generate the service gate 55 to the peripheral device control units 34 for controlling the remainder of an interface sequence for handling either a cycle steal or interrupt request.

When the poll return signal 65 or burst return signal 60 are received at OR circuit 278, poll or burst return trigger 277 will be set. This will render on OR circuit 289 effective to reset the poll tag latch 270. Resetting of the poll tag latch 270, and disappearance of the poll return or burst return signal, will cause AND circuit 290 to reset trigger 277.

The interface check control 81 of FIG. 4 includes means for signalling the initiation of a poll sequence which does not complete properly after a certain period of time. An OR circuit 291 generates a signal on line 292 which enables a poll time out clock. One input is from latch 279, set by AND circuit 276, indicating the beginning of a poll sequence. Another input to OR circuit 291 comes from the poll tag latch 270, which when reset, in turn resets the appropriate components of the poll time out enable. A third input to OR circuit 291 will indicate that the poll return signal 65 remained active for an undue period of time. It should also be noted that burst return 60, which signals the fact that a device has captured the interface for a long period of time for several data transfers, will not contribute to poll time out enable signals 292 since a burst cycle steal may be active for an indefinite period.

The setting of either interrupt cycle latch 283 or cycle steal latch 284 will be effective through OR circuit 287 to set a trigger 293. An AND circuit 294, in the absence of a burst return signal 60, will be effective to reset the precycle latches 273 or 274. Otherwise, a burst return cycle steal transfer will cause the precycle latches 273 and 274 not to be reset for responding to further requests.

An AND circuit 295 will be rendered effective when the service gate return signal 56 is received and the trigger generating the service gate 55 is turned off, to indicate acceptance by a device of the service gate for initiating completion of the cycle. This will then be effective to reset the interrupt cycle latch 283 and cycle steal cycle latch 284.

Figure 24A:
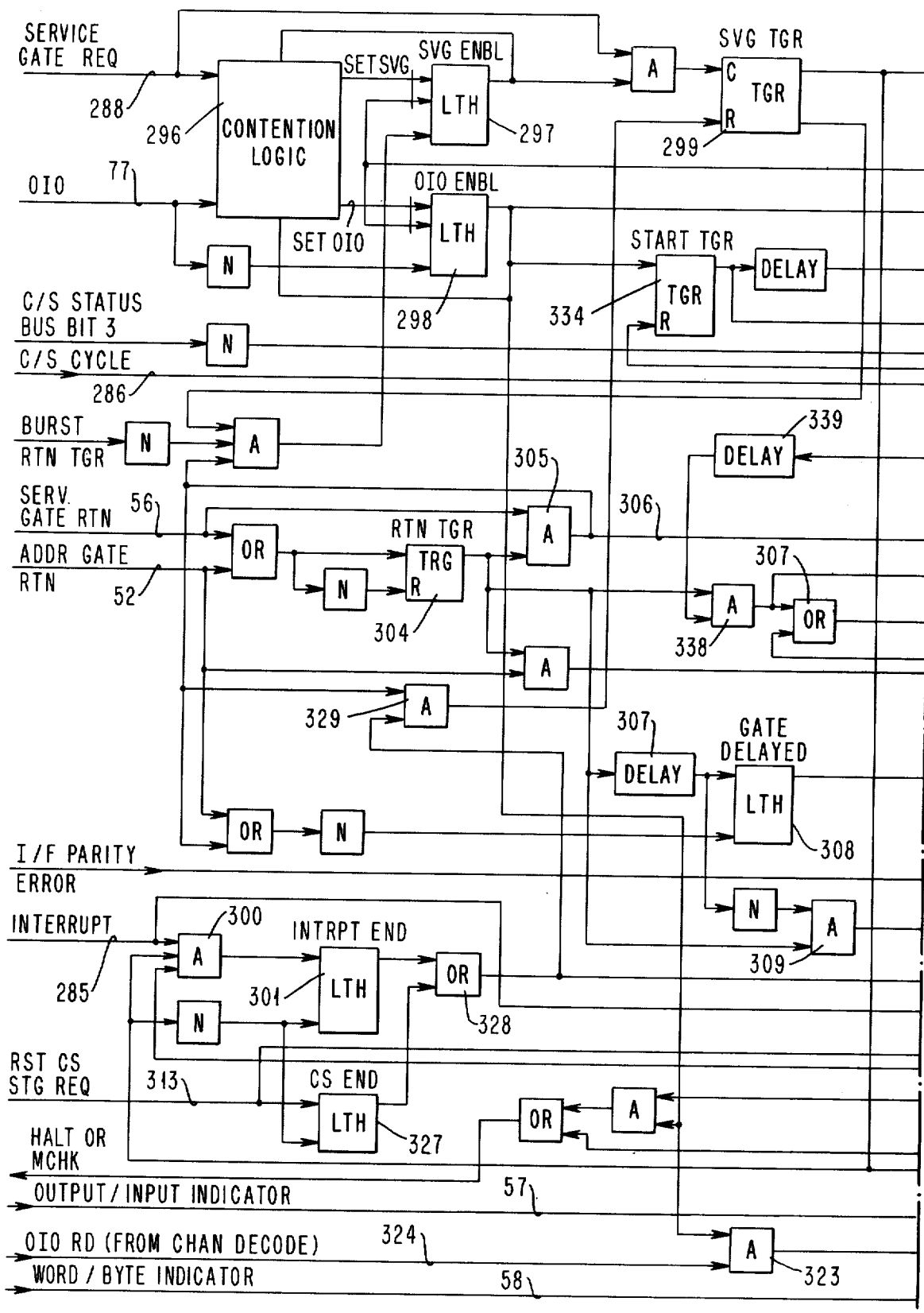

FIGS. 24A, 24B, and 25 show further logical detail of the interface gate control 76 of FIG. 4. Contention logic 296 provides the controls necessary to resolve a tie between the service gate request signal 288 from FIG. 23, indicating a need to use the interface bus 35 for cycle steal or interrupt handling, and the OIO signal 77 from the processor 30. Once this tie is resolved, it presents an output to either a service gate enable latch 297, or the OIO enable latch 298. Assuming the latch 297 is set, a signal is presented to the service gate trigger 299 as a clock input. This trigger coming on is presented to the interface 35 as the service gate tag 55. It is also presented to an AND circuit 300 as a conditional input of an interrupt end latch 301 along with the interrupt cycle 285 and the reset OIO signal 89 from processor 30. The service gate trigger 299 is one input to an OR circuit 302 which also receives inputs from the OIO enable latch 298 and service gate return 56 through AND circuit 355 on line 306 for purposes of generating a gate time out enable signal 303 to the error controls. Once the service gate 55 is presented to the interface, the service gate trigger 299 is then in the waiting state for the arrival of the service gate return signal 56.

Recognition of a service gate return 56 or address gate return 52, is done by a return trigger 304. The logic of the return trigger 304 is such that both the address gate return signal 52 and service gate return signal 56 must be inactive, and then one of the two signals must arrive. This is to ensure that neither of the signals were permanently active on the interface, indicating an error situation. This will result in a time out error due to non-recognition of the service gate return signal 56. The service gate trigger 299 would never be reset, therefore the gate time out enable signal 303 would remain active until the time period for signalling an error had elapsed, setting a machine check condition in the processor 30.

When the service gate return signal 56 goes to a logical 1 state, the return trigger 304 is turned on. The service gate return signal 56 and output of return trigger 304 are applied to an AND circuit 305 which generates an internal service gate return signal 306. The internal service gate return signal 306 is applied as an input to OR circuit 302 signalling to the time out mechanism on line 303 receipt of the service gate return signal 56. The output of the return trigger 304 is applied as an input to a delay 307, the output of which is utilized to set a gate delayed latch 308.

The output of the return trigger 304 and the absence of an output from the delay 307 is effective at an AND circuit 309 to generate a signal 310 effective to clock the information on the condition code in bus 53 into the condition code latches 78 shown in FIG. 4. When the gate delayed latch 308 is set, it provides a clock to a cycle steal storage request trigger 311. Storage request trigger 311 provides an output 312 which is a cycle steal storage request to the storage unit 31. The cycle steal storage request trigger 311 is reset by a signal from the storage unit 31 on line 313 signalling the end of the storage sequence for the cycle steal operation.

The inverted output of the gate delayed latch 308, and the output of the service gate trigger 299 are applied to an AND circuit 314 which is used to gate the I/O address bus 49 into the cycle steal SAR 110 of FIG. 6. This takes place whether the sequence is for an interrupt or a cycle steal operation. The output of AND circuit 314 is also applied to an OR circuit 315 which controls the blocking of information in the cycle steal SDR 94 of FIG. 5. The other input to the OR circuit 315 is from an AND circuit 316 receiving a data strobe 317 from the storage control, the cycle steal cycle signal 286, and the binary state of the output/input indicator 57 from the interface.

The cycle steal signal 286 and a binary 1 indication on the output/input indicator 57 are effective at an AND circuit 318 to activate interface gate C 103 of FIG. 5 to cause cycle steal SDR 94 to be gated to the I/O data bus 50. AND circuit 319 is rendered effective when the output/input indicator 57 is binary 0 to generate a signal on line 320 indicating a cycle steal write data transfer. The inverted signal 320 generates a signal on line 321 to indicate the storage unit 31, a cycle steal read operation. The output of AND circuit 319 is also presented to an OR circuit 322 which enables interface gate B 104 of FIG. 5 to cause data on the I/O data bus 50 to be entered into the cycle steal SDR 94.

The other inputs to OR circuit 322 are a signal on the interrupt cycle line 285, and the output of an AND circuit 323 which received an indication on line 324 of an OIO read code from the command decoder, and the output of the OIO enable latch 298. The cycle steal cycle signal 286 is also applied to an AND circuit 325 along with the binary state of the word/byte indicator 58 for the purpose of indicating to the storage unit 31, on line 326, whether the storage is being cycled for a byte or full word transfer.

When the cycle steal storage request 312 has been generated, the I/O control logic 32 then waits for an indication from the storage unit 31 that the sequence is ended. This is indicated to the I/O control logic 32 by the activation of the signal line reset cycle steal storage request 313, which sets a cycle steal end latch 327. The cycle steal end latch 327 is reset when the service gate trigger 299 is reset.

The interrupt end latch 301 and cycle steal end latch 327 provide inputs to an OR circuit 328. The output of OR circuit 328 is applied to an AND circuit 329 along with the output of the return trigger 304 to reset the service gate trigger 299. The output of OR circuit 328 is also presented to an OR circuit 330 which provides an output to a pulse generator 331 which generates the data strobe 54. The data strobe 54 is applied to an AND circuit 322, along with the internal service gate return signal 306, to provide an input to OR circuit 333 which generates the service gate signal 55 presented to the interface 35. The other input to OR circuit 333 is the service gate trigger 299. When the reset cycle steal storage request signal 313 arrives at the I/O control logic from storage, the data strobe 54 is generated and the service gate trigger 299 is reset. However, the service gate signal 55 remains active until the fall of the data strobe 54. Both data strobe 54 and service gate 55 fall simultaneously signalling the peripheral device control unit 34 that it may now drop its service gate return signal 56.

When the data strobe 54 and service gate 55 have been deenergized, the I/O control logic 32 is again waiting for the peripheral device control unit 34 to drop its service gate return 56. When this happens, the I/O control logic is returned to a normal state waiting for the next output of the contention logic 296 to start a signalling sequence.

When the contention logic 296 responds to an OIO instruction decode signal on line 77, and sets the OIO enable latch 298, bit position 16 of the address bus 49 is energized providing the initial selection of all peripheral device control units 34 on the I/O bus 35. Further, a start trigger 334 is set which, after a certain delay will set an address gate latch 335. Address gate latch 335 initiates the address gate signal 51 in the absence of the decode of a halt I/O instruction indicated on line 88 at an AND circuit 336. The address gate latch 335 will be reset when an OR circuit 337 is rendered effective by either the data strobe 54 or the output of an AND circuit 338. A delay circuit 339 renders AND circuit 338 enabled when the return trigger 304 has received the address gate return signal 52 to thereby reset the address gate latch 335.

In response to an OIO instruction, a number of signal lines must be presented to the processor 30 as represented in FIGS. 5 and 6 for the purpose of transferring the information in the IDCB to the I/O address bus 49 and I/O data bus 50. Therefore, FIG. 24B shows a number of signal lines presented to various registers in the processor 30 for this purpose.

FIG. 25 shows logic for energizing various bit positions of the cycle steal status bus 59. The cycle steal status information is presented to peripheral device control units 34 during cycle steal cycle operations, indicated on line 286. The signal on line 286 enables a series of latches 340 through 343, each associated with a bit position of the cycle steal status bus 59. If any errors are detected by the storage unit 31, for example an invalid storage address 334, storage parity error 345, or storage protect check 346, prior to the reset cycle steal storage request signal 313 in FIG. 24, the appropriate lines would have been activated and registered in the status bus latches 340 through 343 for presentation to the interface on the cycle steal status bus 59. If the I/O control logic 32 had detected a parity error on a storage unit 31 input cycle, then bit position 3 would be energized and the generation of this status bus condition would force a read cycle to the storage unit 31.

The sequence timing check portion of the interface check control 81 of FIG. 4 is shown in more detail in FIG. 26. Each of two timers 347 and 348 is a binary divider chain. When the appropriate enable signal is not active, the chain is held at reset, and incrementing is disabled. When an enable signal becomes active, the divider is allowed to count. The timers are allowed to count in response to a clock signal, a decoder connected to the timers detects the accumulation of a specified number of counts, and will set an I/O check condition on line 83, which condition is stored into the program status word of the processor 30. Should the enable signal to the timer return to an inactive condition before the specified time has elapsed, the timer is reset without signalling the error condition. Timer 347 checks the proper timing of the poll sequence, and timer 348 detects proper timing of the service gate signal and address gate signal.

An AND circuit 349 provides a check on parity errors during interrupt cycles, and an AND circuit 350 provides a check, or error indication, when both the address gate and service gate signals have been generated.

RESIDUAL STATUS REPORTING

Figure 27:
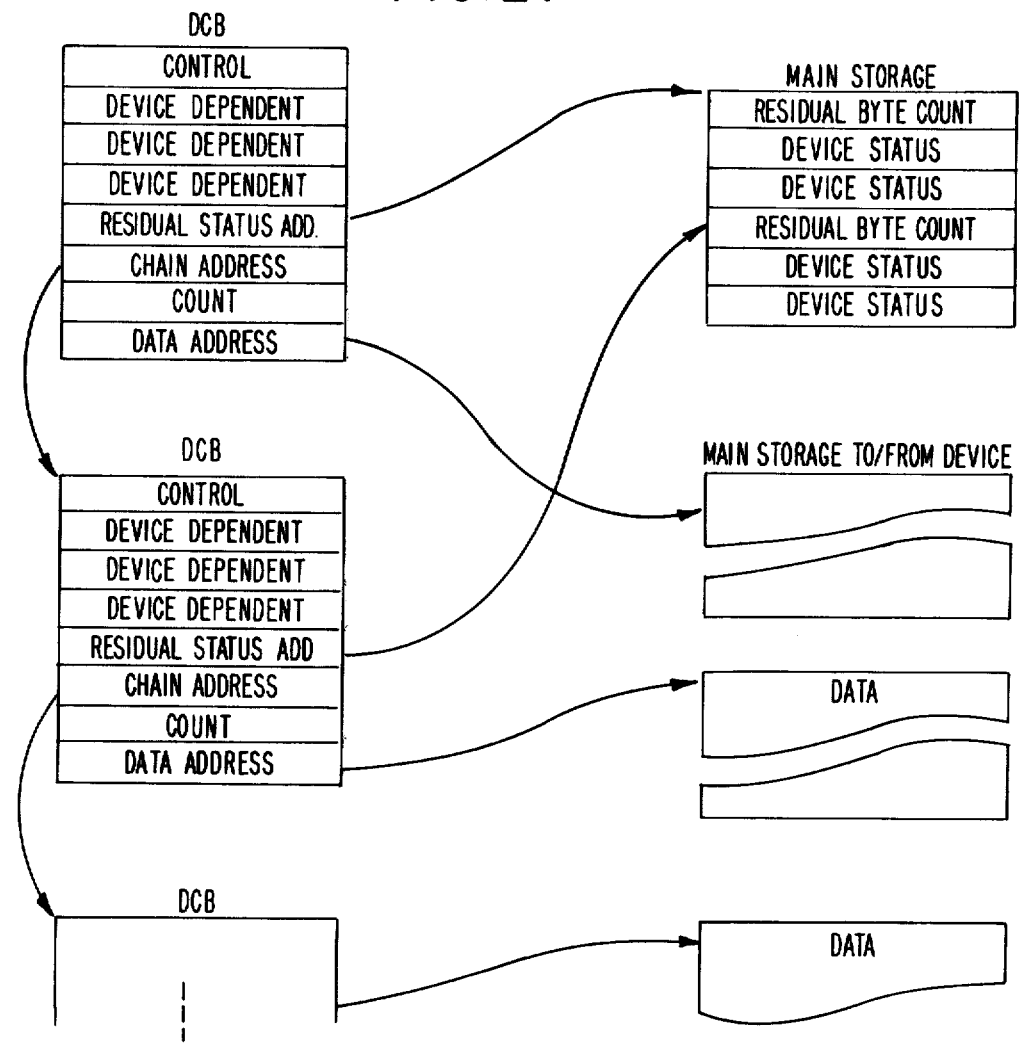
FIG. 27 is a representation of the content and interaction of chained data control blocks, data, and residual status information from a peripheral device utilizing cycle stealing.

FIG. 27 is a further representation of operation of the present invention as it concerns cycle steal operations in which chaining of DCB's is called for, and status information is to be recorded without interrupting the processor 30. The amount of data to be transferred under the control of a DCB is specified in the count field in bytes. An error condition can occur if the data that a device has to transfer does not match the count. This error is called incorrect length record (ILR).

Certain devices such as teleprocessing lines incur an ILR frequently. The program contained in the processor 30, controlling such a device, needs to know certain information about the transfer, such as how much data was transferred. This determination could be made when the ILR is detected for each DCB in the chain. This would require the device to recognize the ILR exception, interrupt the processor, and initiate from the processor a start cycle steal status form of transfer. This operation is time consuming and undesirable if, as indicated previously, the ILR is the normal condition rather than the exception to the device operation.

When an ILR is the norm and appears frequently, the program may wish to suppress its detection and reporting as an error. This can be accomplished in accordance with the present invention by use of the suppress incorrect length (SIL) flag found in bit position 4 of the control word in each DCB. When the SIL flag is on, device dependent parameter word 4 in the DCB is redefined as the residual status address.

Recalling that the complete DCB is transferred from the storage unit 31 to a peripheral device control unit 34, the residual status address is registered in the storage 124 of the microprocessor 47 of the peripheral device control unit. When the device 33 has finished its data transfers for the particular DCB, it will use the residual status address during subsequent cycle steal transfer operations to store its residual count (the count remaining after the data transfer) and up to two additional device status words into storage 31. The SIL bit being a 1 has, in effect, defined the ILR as not being an exception condition. With no exception condition to report, the device may then utilize the chain address information of the DCB (if so specified in the DCB) to obtain the next DCB in the chain and continue. Since the information needed by the program in the processor 30 is automatically stored, the program need not execute a start cycle steal status transfer to the device after each DCB fetch and execution.

A desirable feature of this operation is the ability to have the residual status information stored in an independent location in storage defined by the program and inserted in each of the DCB's. Thus, the DCB may remain a read only block of information in main storage at the option of a programmer. This also provides the ability to build up a contiguous block of status information during multiple DCB chain operations, thus relieving the programmer of the additional burden of having to sort the status information from individual data control blocks.

We claim:

1. A peripheral device control unit for use in a data processing system including a central processor unit, storage unit, I/O control logic unit, and an interface (I/F) bus with a plurality of I/F lines for interconnecting and transferring between said storage unit and a peripheral device, under control of instructions executed by said central processor unit, information, command, control, address, and status signals in parallel between the I/O control logic unit and one or more of said peripheral device control units, and a further I/F line for transferring a poll signal from the I/O control logic unit and one or more of said peripheral device control units in series, certain of the I/F lines transferring to the peripheral device control unit for storage therein, signals indicating an interrupt priority level and poll identifier signals associated with said interrupt priority levels, and certain of the I/F lines including a plurality of interrupt request signal lines for signalling to the I/O control logic unit an interrupt request on a particular one of said interrupt request signal lines associated with the priority interrupt level, said peripheral device control unit comprising:
    indicating means for storing and indicating an interrupt request status received from an attached peripheral device;
    means responsive to said indicating means for energizing one of the interrupt request lines associated with the priority level stored;
    further indicating means for storing a data transfer request status received from an attached peripheral device;
    means responsive to said further indicating means for energizing a further I/F line on the interface bus for signalling a cycle/steal (CS) request to the I/O control logic unit;
    poll signal receiving means connected to said further I/F line and poll identifier signal receiving means connected to said I/F lines transmitting said poll identifier signals;
    means connected and responsive to the stored interrupt priority level and said poll identifier signal receiving means for providing an equal signal;
    decode means connected to said poll identifier signal receiving means for providing a CS poll signal; and
    means, connected and responsive to, either said equal signal or said CS poll signal, and said poll signal receiving means for providing a request granted indication to said attached peripheral device.

2. A peripheral device control unit in accordance with claim 1 wherein another of the lines of the interface bus transfers an interrupt mask bit having a binary 1 or binary 0 state and said peripheral device control unit further includes:
    mask bit storing means for receiving the mask bit from the interface bus; and
    inhibit means, connected to said mask bit storing means and said interrupt request indicating means, operative when said mask bit is in a particular one of the two binary states, to prevent energization of the interrupt request lines.

3. A peripheral device control unit in accordance with claim 1 wherein said poll signal receiving means includes:
    poll propagate signal means for transferring a received poll signal to succeeding ones of said peripheral device control units,
    poll return signal means connected to another of the lines of the interface bus, and connected and responsive to, said request granted indicating means for signalling the I/O control logic, capture of the poll signal; and
    means, connected and responsive to said request granted indicating means, and connected to said poll propagate signal means for inhibiting operation of said poll propagate signal means.

4. A peripheral device control unit in accordance with claim 3 wherein said poll signal receiving means includes:
    first and second poll signal input lines and a poll signal output line;

means connecting said first poll signal input line of one said peripheral device control unit to said poll propagate signal means of a first peripheral device control unit adjacent and next preceding the one said peripheral device control unit;

means connecting said second poll signal input line to said poll propagate signal means of a second said peripheral device control unit adjacent and next preceding said first peripheral device control unit;

means generating a poll signal on said poll signal output line in response to the presence of a poll signal on both said first and second input lines; and means, operative in response to the absence of an interconnection to either said first peripheral device control unit or said second preceding peripheral device control unit, for forcing the corresponding first or second poll signal input line to a condition representing a received poll signal.

5. Input/output (I/O) control logic for use in a data processing system including a central processor unit (CPU) for initiating I/O operations and responding to I/O interrupt requests, a storage unit, one or more peripheral device control units each with an attached peripheral device, and an interface (I/F) bus having a plurality of I/F lines for interconnecting said I/O control logic and said peripheral device control units in parallel for transferring between said storage unit and a peripheral device, information, command, control, address and status signals, and a further line for transferring a poll signal from said I/O control logic to one or more of the peripheral device control units in series, certain of the I/F lines transferring to the peripheral device control units for storage therein, signals indicating one of several priority levels, and coded poll identifier signals associated with said priority levels, and certain of the I/F lines including a plurality of interrupt request signal lines from said peripheral device control units for signalling to said I/O control logic an interrupt request on a particular one of said interrupt request lines associated with a particular priority level, said I/O control logic including:

priority determining means connected to the interrupt request signal lines for selecting an interrupt request to acknowledge;

cycle steal (CS) request receiving and indicating means connected to a further line on the interface bus, indicating a request for a data transfer by any one of said peripheral device control units;

poll identifier signal means connected for energizing the poll identifier lines of the interface bus;

poll signal generating means connected for energizing a further line on the interface bus;

poll sequence control means connected and responsive to said priority determining means and said CS request receiving means, and connected and operative to energize, said poll signal generating means and said poll identifier signal means to thereby transfer to the peripheral device control units a poll signal, and a first predetermined coded poll identification signal acknowledging receipt of, and poll for, any CS request, or other coded poll identification signals, each associated with a priority level and interrupt request to be acknowledged.

* * * * *